(12) United States Patent
Suzuki et al.

(10) Patent No.: US 7,596,448 B2
(45) Date of Patent: Sep. 29, 2009

(54) NAVIGATION SYSTEM FOR A MOTORCYCLE, AND MOTORCYCLE INCORPORATING SAME

(75) Inventors: Koji Suzuki, Saitama (JP); Yuichi Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 867 days.

(21) Appl. No.: 11/116,815

(22) Filed: Apr. 28, 2005

(65) Prior Publication Data
US 2005/0267674 A1  Dec. 1, 2005

(30) Foreign Application Priority Data
May 31, 2004  (JP)  ............... 2004-162416

(51) Int. Cl.
*B62J 39/00* (2006.01)
*G06F 19/00* (2006.01)

(52) U.S. Cl. ............... 701/200; 701/211; 701/36; 340/995.1

(58) Field of Classification Search .............. 701/200, 701/211, 1, 36; 340/995.1; 345/1, 161, 172, 345/33; 348/113; 361/681
See application file for complete search history.

(56) References Cited

U.S. PATENT DOCUMENTS 6,157,297 A * 12/2000 Nakai .................. 340/461
6,224,222 B1 * 5/2001 Inoguchi et al. ........... 362/29
6,249,744 B1 * 6/2001 Morita ................... 701/213
6,575,583 B2 * 6/2003 Suzuki et al. ............. 362/23
6,876,924 B2 * 4/2005 Morita et al. ............ 701/211

FOREIGN PATENT DOCUMENTS

| DE | 10013930 | 11/2000 |
|---|---|---|
| DE | 10212147 | 10/2002 |
| DE | 10336288 | 2/2004 |
| EP | 1186475 | 3/2002 |
| JP | 2001-260709 (A) | 9/2001 |
| JP | 2003-146277 | 5/2003 |

OTHER PUBLICATIONS

U.S. Appl. No. 2001/028,176, filed Oct. 11, 2001, Suzuki et al.

* cited by examiner

*Primary Examiner*—Tan Q Nguyen
(74) *Attorney, Agent, or Firm*—Carrier, Blackman & Associates, P.C.; William D. Blackman; Joseph P. Carrier

(57) ABSTRACT

An arrangement of motorcycle navigation system components enables both a meter display unit and a navigation display unit to be easily viewed by the vehicle operator. A motorcycle includes a meter display unit for displaying drive information such as a vehicle speed or a travel distance, and a navigation display unit for displaying the destination or the current vehicle position. Both display units are covered by a single transparent panel which permits the displays to be viewed therethrough. The navigation display unit is arranged behind the meter display unit, relative to the front of the vehicle, so as to protrude rearwardly with respect to the meter display unit, to give a driver of the motorcycle a clear view of both units, without significant overlap.

20 Claims, 20 Drawing Sheets

NAVIGATION SYSTEM FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2004-162416, filed on May 31, 2004. The subject matter of this priority document is incorporated by reference herein.

BACKGROUND OF THE INVENTION

1. Field of the Invention

The present invention relates to an improved arrangement of the components of a motorcycle navigation system which can display a destination or a current vehicle position.

2. Background

The conventional arrangement of a motorcycle navigation system is achieved by mounting the monitor display, or navigation display unit, within a viewable range of an operator, and connecting a navigation body to the monitor display. In a conventional arrangement, the navigation system components are positioned on the instrument panel of the vehicle to permit convenient viewing of the navigation system visual display.

In the arrangement for a motorcycle navigation system described above, it is also conventional to provide a speaker in the instrument panel for use with audio components as well as to accommodate the auditory output from the navigation system. In the conventional arrangement, the navigation display unit is arranged near the speaker. A motorcycle which includes this known configuration is disclosed in JP-A-2003-146277 (P.6, FIG. 2).

However, in the arrangement structure of a motorcycle navigation system in the related art, the navigation display unit is installed at a position nearer to the operator relative to the speaker, with adverse effects on the speaker sound. For example, the volume of speaker is continually set to a high value. In addition, in the arrangement structure of a motorcycle navigation system in the related art, it is desirable to position the navigation display unit at a location which does not hinder the operator's view of the instrument panel, including the meter display unit.

In other words, it is desirable to obtain an arrangement structure of a motorcycle navigation system in which the navigation display unit can be arranged at a position which does not affect the speaker sound, and which also allows the operator to view the meter display unit without hindrance.

SUMMARY OF THE INVENTION

The present invention provides an arrangement of components that permits both the navigation display unit and the meter display unit to be easily viewed by the operator.

The motorcycle navigation system according to a first aspect of the invention includes a meter display unit for displaying drive information such as a vehicle speed or a travel distance, a navigation display unit for displaying a destination or a current vehicle position, and a single transparent panel for covering both the meter display unit and the navigation display unit. The panel permits the operator to view the meter display unit and the navigation display unit therethrough. The invention is characterized in that the navigation display unit is disposed behind the meter display unit relative to the front of the vehicle. Moreover, the navigation display unit is constructed so as to protrude rearwardly toward the operator with respect to the meter display unit. In other words, the navigation display unit is positioned between the operator and the meter display unit.

Therefore, by disposing the navigation display unit behind the meter display unit so that it protrudes toward the operator with respect to the meter display unit, for example, the operator can easily hear the speaker sound and easily view the meter display unit.

A second aspect of the invention is characterized in that the meter display unit and the navigation display unit are integrated within the panel. A frame body is provided with the panel so as to frame the navigation display unit independently from the meter display unit so as to distinguish the appearance of the navigation display unit from that of the meter display unit. By providing the meter display unit and the navigation display unit integrally in the panel, and providing the frame body with the panel for displaying the navigation display unit independently in appearance from the meter display unit, for example, electrical circuits of the meter display unit and of the navigation display unit can be bundled together.

A third aspect of the invention is characterized in that the motorcycle navigation system includes a navigation display unit for displaying navigation information such as a destination or a current vehicle position, a control unit for driving the navigation display unit, and an operating element connected to the control unit. In the invention, the control unit is disposed in a trunk box provided in the rear of a vehicle body. By disposing the control unit in the trunk box provided in the rear of the vehicle body, a sufficient space for arranging the meter display unit and the navigation display unit in the view of the operator is secured.

A fourth aspect of the invention is characterized in that the control unit is mounted along a wall surface of the trunk box. By mounting the control unit along the wall surface of the trunk box, the control unit can be stored in the trunk box without impairing the usability of the trunk box.

A fifth aspect of the invention is characterized in that the control unit includes a base member which abuts and confronts a wall surface of the trunk box, a unit body for positioning the control unit on the base member, and a cover member for covering the unit body. The unit body is fixed by being sandwiched between the base member and the cover member by securing the base member and the cover member together and to the wall surface. By forming the control unit of the base member, the unit body, and the cover member, the control unit can be stored while maintaining the article storing function of the trunk box.

According to the first aspect of the invention, since the navigation display unit is disposed behind the meter display unit relative to the front of the vehicle, and is arranged to protrude toward the rear with respect to the meter display unit, the operator can easily hear the speaker sound and easily view the meter display unit.

According to the second aspect of the invention, since the meter display unit and the navigation display unit are integrated within the panel, and the frame body is provided on the panel for displaying the navigation display unit independently in appearance from the meter display unit, the electrical circuits of the meter display unit and of the navigation display unit can be bundled together. Consequently, the cost of the meter display unit and the navigation display unit can be advantageously reduced.

According to the third aspect of the invention, since the control unit is disposed in the trunk box provided in the rear of the vehicle body, a sufficient space for arranging the meter display unit and the navigation display unit within the view of the operator is secured. Consequently, the navigation system can easily be advantageously be mounted to the vehicle.

According to the fourth aspect of the invention, the control unit is mounted along the wall surface of the trunk box, and the control unit can be stored in the trunk box without impairing the usability of the trunk box. Consequently, the control unit can advantageously be stored while maintaining the convenience of the trunk box.

According to a fifth aspect of the invention, since the control unit includes the base member which abuts and confronts the wall surface of the trunk box, the unit body for positioning the control unit on the base member, and the cover member for covering the unit body, the control unit can be advantageously stored while maintaining the article storing function of the trunk box.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

Figure 1:
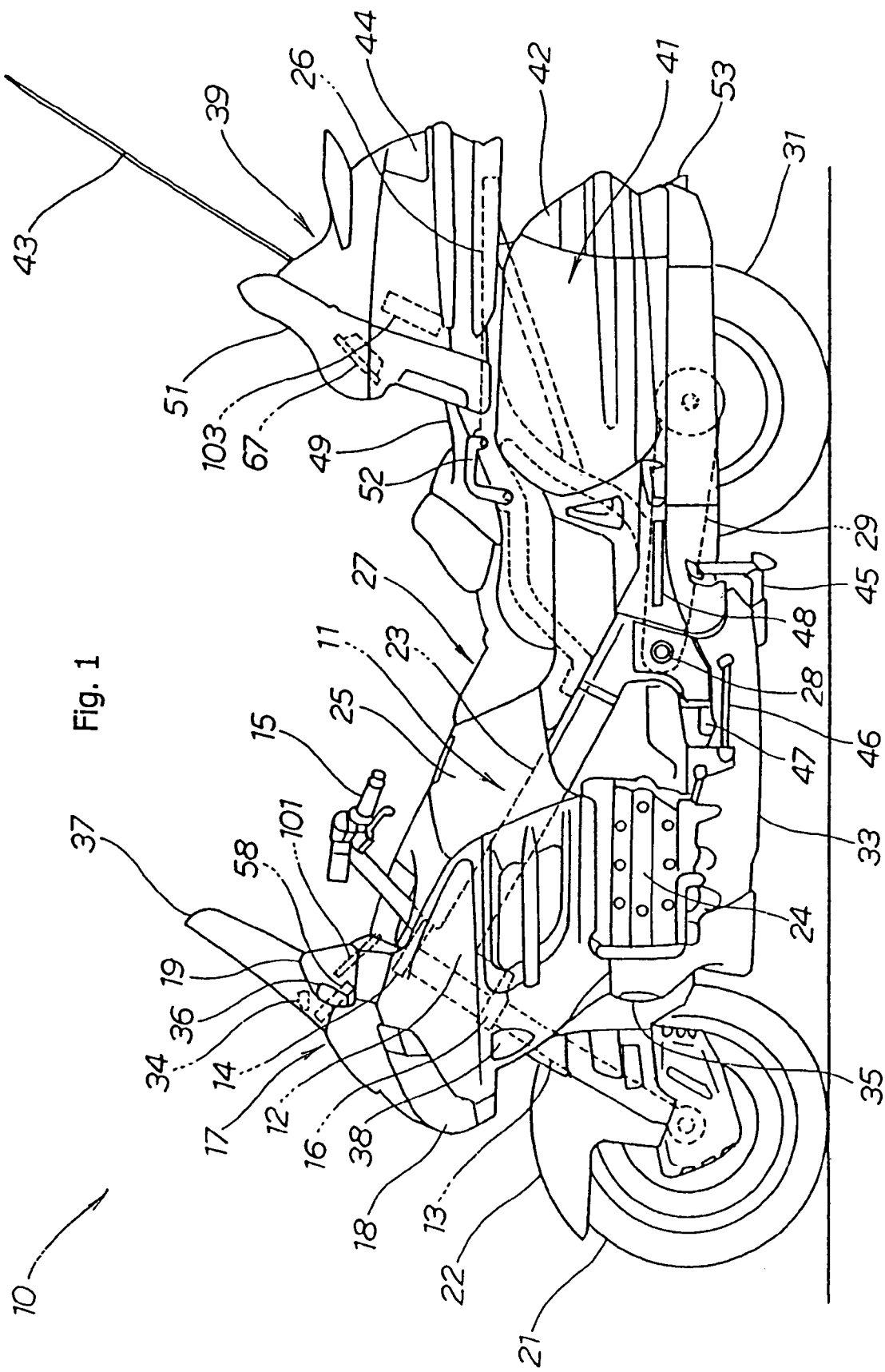
FIG. 1 is a side view of a motorcycle in which an acoustic system and a navigation system according to the present invention are employed.

Referring now to the drawings, the best mode for carrying out the present invention will be described.

FIG. 1 is a side view of a motorcycle 10 in which an acoustic system 60 and a navigation system 100 according to the present invention are employed. The motorcycle 10 includes a head pipe 12 mounted to a vehicle body frame (vehicle body) 11, a front fork 13 mounted to the head pipe 12 so as to be steerable, and a steering handle 15 mounted to the top bridge 14 of the front fork 13. A fairing 17 is provided forwardly of a top bridge 14 and a bottom bridge 16. Head lights 18, 18 (one of the numerals 18 is not shown) and left and right mirrors 19, 19 (one of the numerals 19 is not shown) are disposed on the front surface of the fearing 17. A front wheel 21 is mounted to the lower portion of the front fork 13, a front fender 22 covers the front wheel 21, and a main frame 23 of the vehicle body frame 11 extends rearward from the head pipe 12. An engine 24 is disposed in the lower portion of the main frame 23, a fuel tank 25 is disposed on the upper portion of the main frame 23, and a seat rail 26 extends rearward from the main frame 23. A vehicle seat 27 is mounted to the seat rail 26. A rear swing arm 29 extends from the lower rear portion of the main frame 23 via a pivot 28, and a rear wheel 31 is rotatably mounted to the rear end of the rear swing arm 29. A rear shock absorber (not shown) extends between the rear portion of the rear swing arm 29 and the vehicle body frame 11.

The motorcycle 10 includes an under cover 33, a global positioning system (GPS) antenna 34, and a fog lamp 35. The motorcycle 10 further includes a front turn indicator 36, a wind screen 37, and an air opening 38 opened on the fairing 17 for supplying air to the engine 24. The motorcycle 10 still further includes a trunk box 39, a saddle bag 41, a rear turn indicator 42, a rod antenna 43, a tail lamp 44, a main stand 45, a sub stand 46, an operator's step 47, and a passenger's step 48.

The vehicle seat 27 includes a passenger seat 49 on which a passenger is seated. The passenger seat 49 includes a seat back 51 upon which the passenger places his/her back, and grab rails 52, 52 (52 on the far side is not shown in FIG. 1, but is shown in FIG. 2), that the passenger grips.

Figure 2:
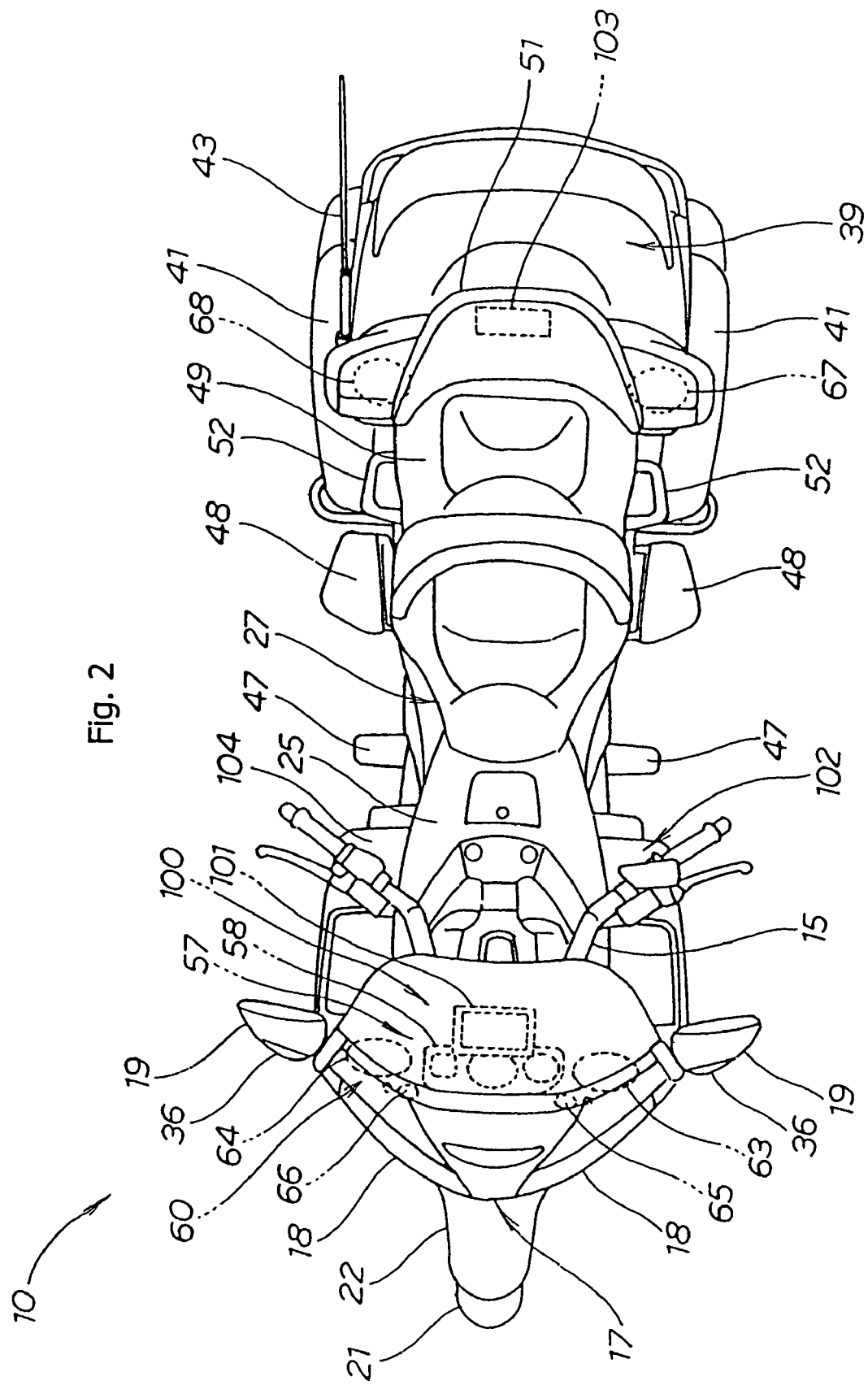
FIG. 2 is a top plan view of the motorcycle of FIG. 1, showing the speakers of the acoustic system mounted at both the front and rear of the motorcycle, and showing the navigation system display unit mounted at the front the vehicle and the navigation system control unit mounted within the trunk box at the rear of the vehicle.

FIG. 2 is a top plan view of the motorcycle in which an acoustic system 60 and a navigation system 100 according to the present invention is employed. An acoustic system (speaker system) 60 for the motorcycle according to the present invention includes left and right midrange/woofer units 63, 64 on the respective left and right sides of a meter display unit (vehicle meter) 58. The acoustic system 60 includes a left tweeter unit 65 for regenerating high-notes disposed between the meter display unit 58 and the left midrange/woofer unit 63, and a right tweeter unit 66 for regenerating high-notes disposed between the meter display unit 58 and the right midrange/woofer unit 64. The acoustic system 60 further includes left and right super woofer units (super woofer speakers) 67, 68 disposed in the trunk box 39 which can regenerate a frequency range lower than the left and right midrange/woofer units 63, 64, and a component 69 as an audio device for causing the units 63-68 to generate regenerated sound.

Since the acoustic system (speaker system) 60 for the motorcycle includes the component (audio device) 69 (FIG. 5, 12) connected to the left and right midrange/woofer units and the left and right tweeter units, a listener can enjoy spoken conversation or music with realistic sensations.

The component 69 represents herein a device having functions such as, but not limited to, a tuner, a CD (compact disk) deck, a MD (mini disc) deck, a cassette deck, and/or an amplifier.

By providing the vehicle seat 27 on which the operator is seated, then placing the trunk box (trunk space) 39 rearwardly of the vehicle seat 27, and then disposing the super woofer units 67, 68 which can regenerate the frequency range lower than the left and right midrange/woofer units (midrange/woofer speakers) 63, 64 in the trunk box 39, a sound having a wide frequency range can be regenerated without loosing the spatial efficiency around the fairing 17 (or a meter panel 57).

A motorcycle navigation system 100 according to the present invention is a system in which a navigation display unit 101 is arranged rearwardly of the meter display unit 58 relative to the forward direction of the vehicle. An operating element 102, divided into sections, is arranged around the steering handle 15 and an upper panel 104, and a control unit (controller) 103 is stored in the trunk box 39, which will be described in detail in conjunction with FIG. 12 to FIG. 28.

Figure 3:
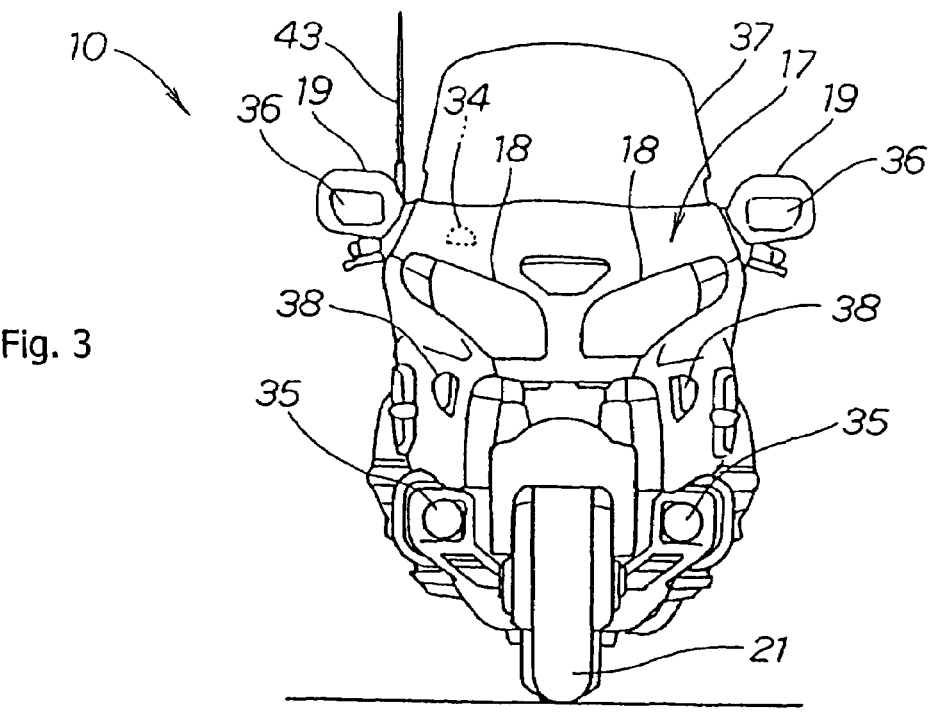
FIG. 3 is a front view of the motorcycle of FIG. 1 showing the GPS antenna mounted within the fairing on the front of the vehicle.

FIG. 3 is a front view of the motorcycle employing the acoustic system and the navigation system according to the present invention, showing that the GPS antenna 34 is arranged at the front of the vehicle body, the left and right fog lamps 35, 35 are arranged on the lower portion of the vehicle body, and the head lights 18, 18 are arranged on the fairing 17. Also, the left and right mirrors 19, 19 are disposed on the fairing 17, the left and right front turn indicators 36, 36 are integrally built in the mirrors 19, 19, and the left and right air openings 38, 38 are provided on the fairing 17.

The GPS antenna 34 is preferably a tip antenna, a batch antenna, or a helical antenna, which can be built in the meter panel (instrument panel) 57 or the fairing 17.

Figure 4:
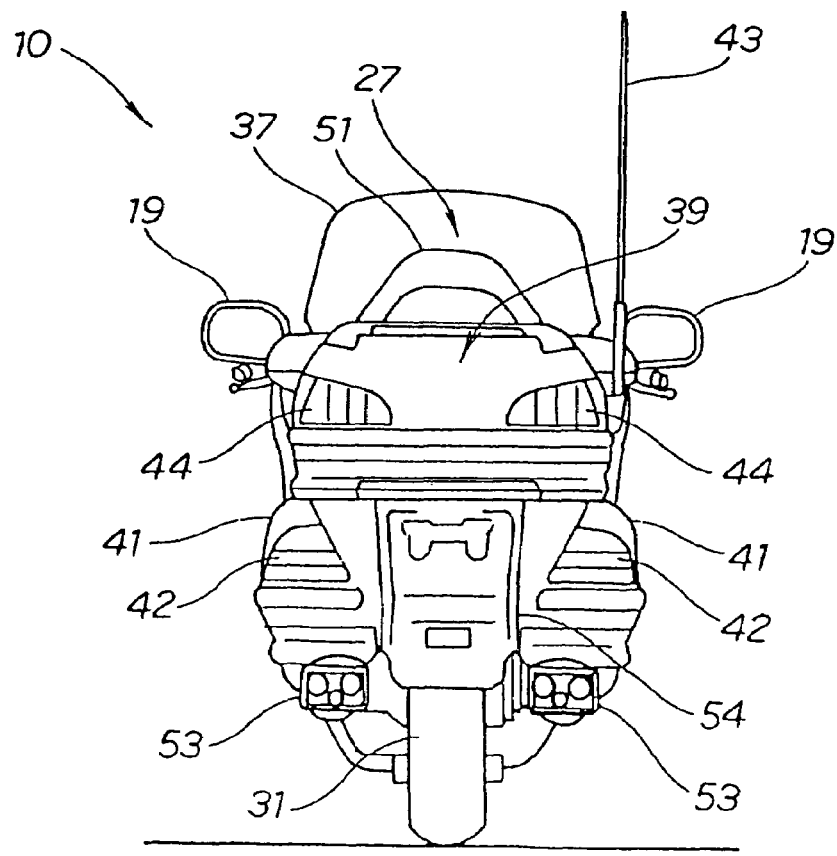
FIG. 4 is a back view of the motorcycle of FIG. 1 showing the trunk box located at the rear of the vehicle.

FIG. 4 is a rear view of the motorcycle employing the acoustic system and the navigation system according to the present invention, showing that the trunk box 39 is disposed at the rear center of the vehicle body, the left and right saddle backs 41, 41 are disposed on both sides of the trunk box 39, and the left and right rear turn indicators 42, 42 are disposed on the back surfaces of the left and right saddle bags 41, 41. In addition, the rod antenna 43 is disposed on the right side of the trunk box 39, the left and right tail lamps 44, 44 are disposed on the back surface of the trunk box 39, left and right mufflers 53, 53 are disposed on the lower portion of the vehicle body, and a rear wheel 31 is covered by the rear fender 54.

Figure 5:
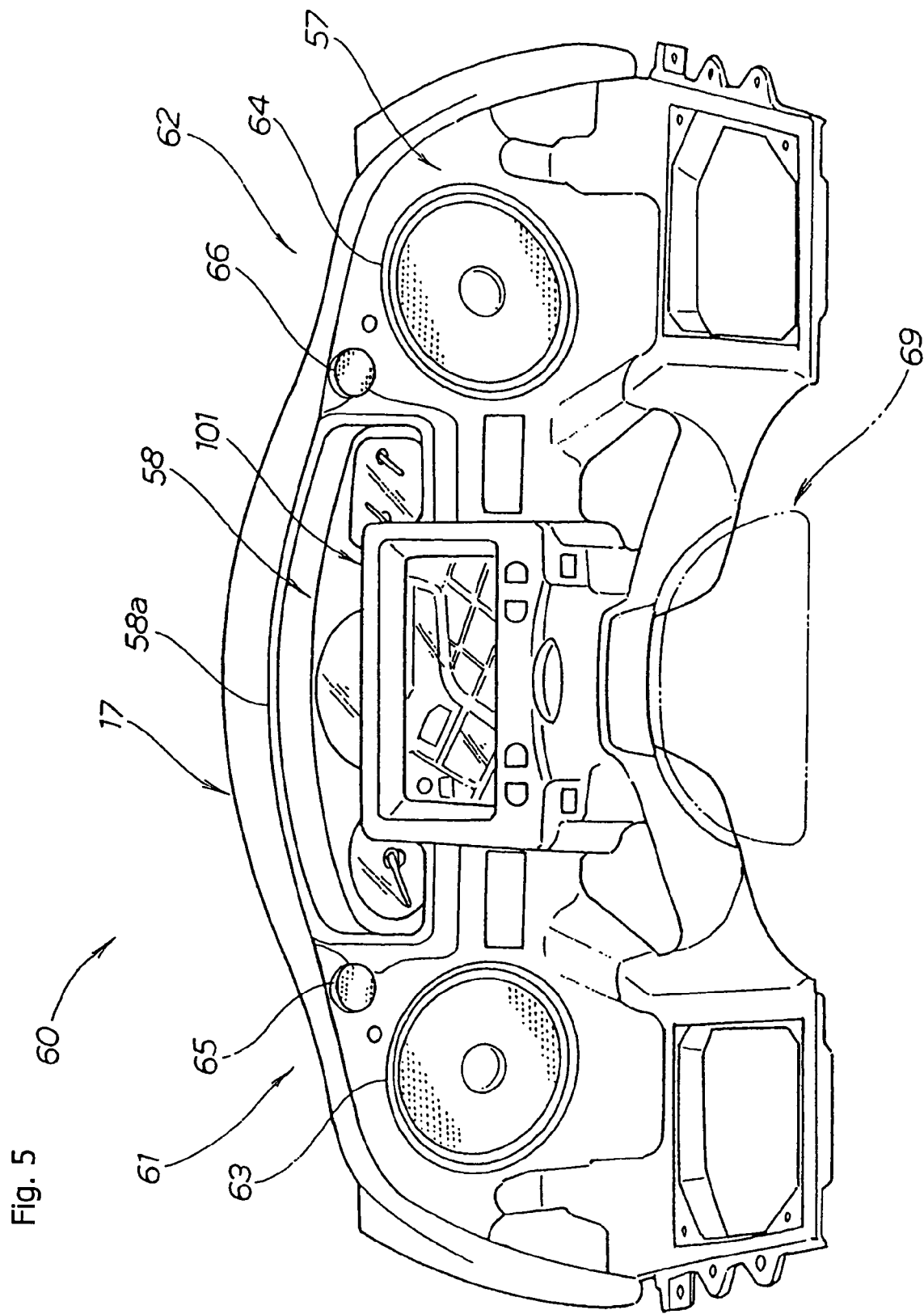
FIG. 5 is a perspective view of the acoustic system for the motorcycle according to the present invention as seen from the view of the operator, showing the navigation display unit protruding from the meter display unit.

FIG. 5 is a perspective view of the acoustic system for the motorcycle according to the present invention. The acoustic system 60 for the motorcycle 10 (see FIG. 1) includes the meter display unit 58 for displaying drive information such as a vehicle speed or a travel distance provided in front of the operator, and left and right speaker systems 61, 62 provided on both sides of the meter display unit 58 for producing regenerated sound such as spoken conversation or music. The left speaker system 61 includes the left midrange/woofer unit (midrange/woofer speaker) 63 disposed on the left side of the meter display unit 58 for regenerating the midrange and bass sound, and the left tweeter unit (tweeter speaker) 65, disposed between the meter display unit 58 and the left midrange/woofer unit 63, for regenerating high-notes. The right speaker system 62 includes the right midrange/woofer unit 64 disposed on the right side of the meter display unit 58 for regenerating the midrange and bass sound, and the right tweeter unit 66, disposed between the meter display unit 58 and the right midrange/woofer unit 64, for regenerating the high-notes. As shown in FIG. 2, the left speaker system 61 includes the left super woofer unit 67 in the trunk box 39, and the right speaker system 62 includes the right super woofer unit 68 in the trunk box 39.

The meter panel, or instrument panel, 57 is a panel in which the left and right midrange/woofer units 63, 64 and the tweeter units 65, 66 can be arranged, and also a panel in which the meter display unit 58 and the navigation display unit 101 are arranged.

The left and right midrange/woofer units 63, 64 are provided with saran nets for protecting the midrange/woofer units 63, 64.

For example, it is preferable to enable generated high-notes sound to reach (be transmitted to) the operator (rider) sufficiently during travel as well because the operator can hear the sound with realistic sensation.

Therefore, by configuring the speakers 61, 62 of the midrange/woofer units 63, 64 and the tweeter units 65, 66, the high-note sound can be easily regenerated. Consequently, the regenerated high-note sound can reach (be transmitted to) the operator (rider) during travel as well. That is, the operator can hear the sound with realistic sensations.

By arranging the tweeter unit 65 between the meter display unit 58 and the midrange/woofer unit 63, and by arranging the tweeter unit 66 between the meter display unit 58 and the midrange/woofer unit 64, the space around the meter display unit 58 can be efficiently used. Thus, the spatial efficiency around the meter display unit 58 can be improved.

The left and right tweeter units 65, 66 are arranged so as to be oriented toward the operator. By arranging the left and right tweeter units 65, 66 toward the operator, the high-note sound, which has high directivity, can be transmitted reliably to the operator.

Figure 6:
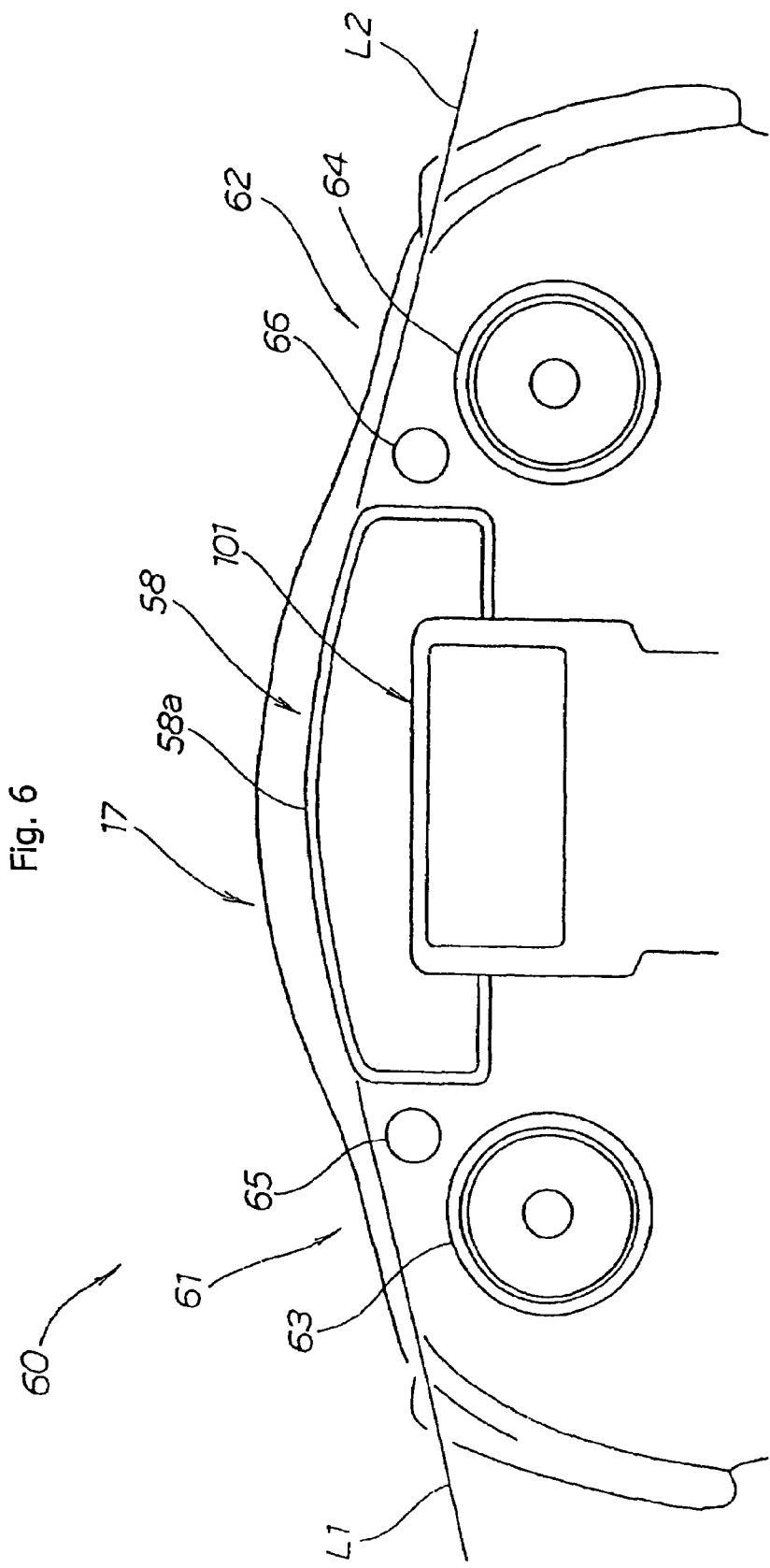
FIG. 6 is a layout drawing of the acoustic system for the motorcycle of FIG. 5, showing extension lines L1 and L2 extending laterally from the upper outline of the meter display unit.

FIG. 6 is a layout drawing of the acoustic system for the motorcycle according to the present invention, showing a front view of the acoustic system 60 for the motorcycle.

In the acoustic system 60 for the motorcycle, the left and right tweeter units 65, 66 are arranged below extensions L1, L2, which are drawn so as to be extended from an upper ridge line (upper outline) 58a of the outline of the meter display unit 58 in the lateral directions.

By arranging the left and right tweeter units 65, 66 below the extensions L1, L2, the tweeter units 65, 66 can be arranged so as to maintain the visibility of the meter display unit 58. In comparison with the case in which the left and right tweeter units 65, 66 are positioned on the edge portion of the meter display unit 58, the outline of the meter display unit 58 can be prevented from increasing in size.

Figure 7:
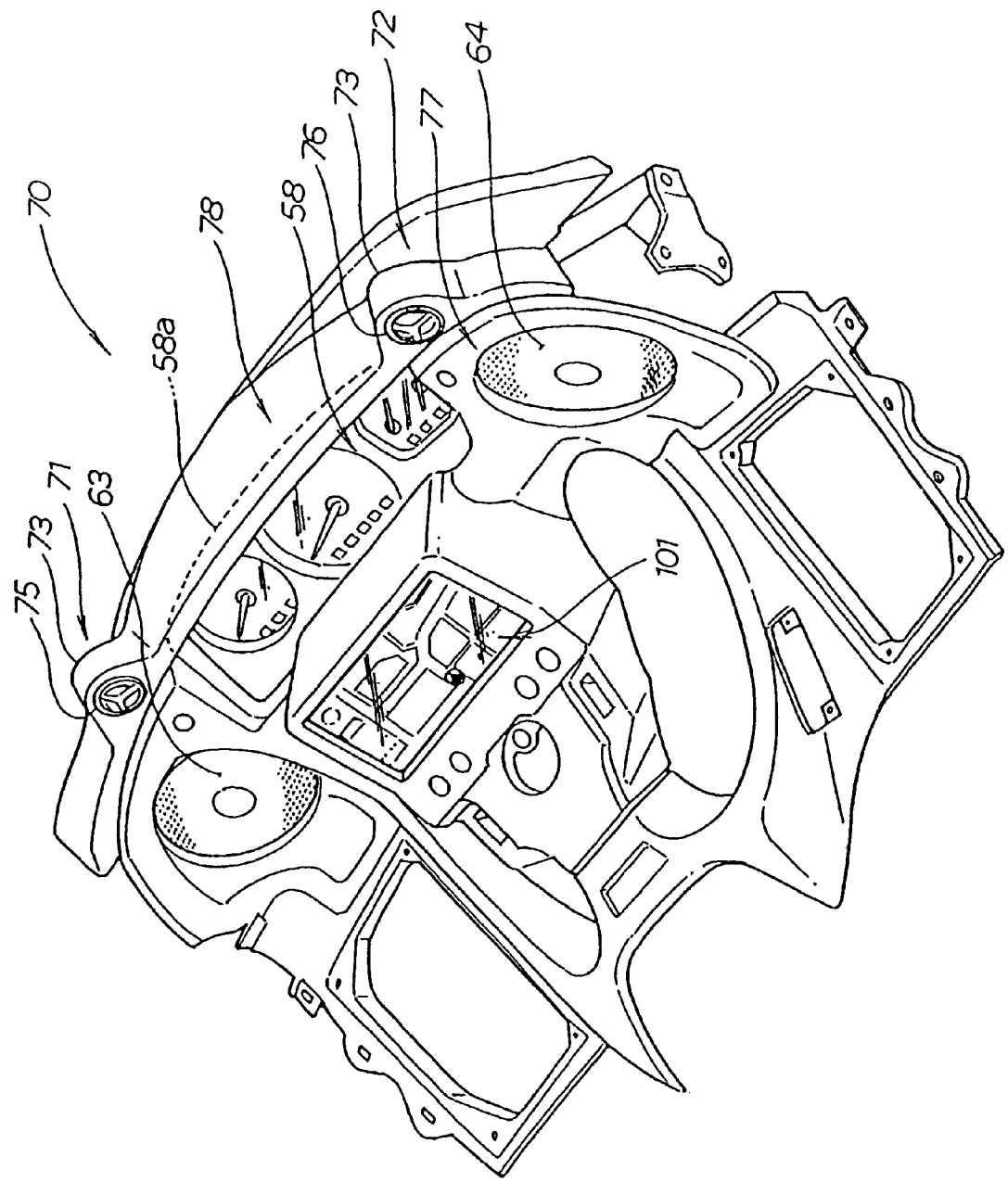
FIG. 7 is a perspective view of the acoustic system for the motorcycle according to a second embodiment of the present invention.

FIG. 7 is a perspective view of the acoustic system 70 for the motorcycle according to a second embodiment of the present invention. In the description of the second embodiment, the same parts as the acoustic system 60 for the motorcycle are represented by the same reference numerals and detailed description will be omitted.

In an acoustic system 70 for the motorcycle, the left and right midrange/woofer units (midrange/woofer speakers) 63, 64 are arranged on both sides of the meter display unit 58. In addition, a dash board 78 is provided on the upper portion of a meter panel (instrument panel) 77, cover members (speaker boxes) 73, 73 are integrally provided on the left and right of the upper surface of the dash board 78, and left and right tweeter units (tweeter speakers) 75, 76 are disposed on the cover members 73, 73 via baffles 74, 74 (see FIG. 8) described later.

A left tweeter speaker assembly 71 includes the cover member 73, the baffle 74, and the tweeter unit 75. Likewise, a right tweeter speaker assembly 72 includes the cover member 73, the baffle 74, and the tweeter unit 76.

In the acoustic system 70 for the motorcycle, the left and right tweeter units 75, 76 are arranged on the meter display unit 58 so as to protrude upwardly from the vehicle body. Specifically, the units 75, 76 protrude upwardly from the upper ridge line 58a. As described with respect to FIG. 9, the side surfaces and the bottoms of the left and right tweeter units 75, 76 are covered by the cover members 73, 73.

By arranging the left and right tweeter units 75, 76 on the meter display unit 58 so as to protrude upwardly of the vehicle body from the upper ridge line 58a, and by covering the side surfaces and the bottoms of the left and right tweeter units 75, 76 by the cover members 73, 73, the existence of the left and right tweeter units 75, 76 can be emphasized, thereby giving a high-quality appearance to the acoustic system 70.

Figure 8:
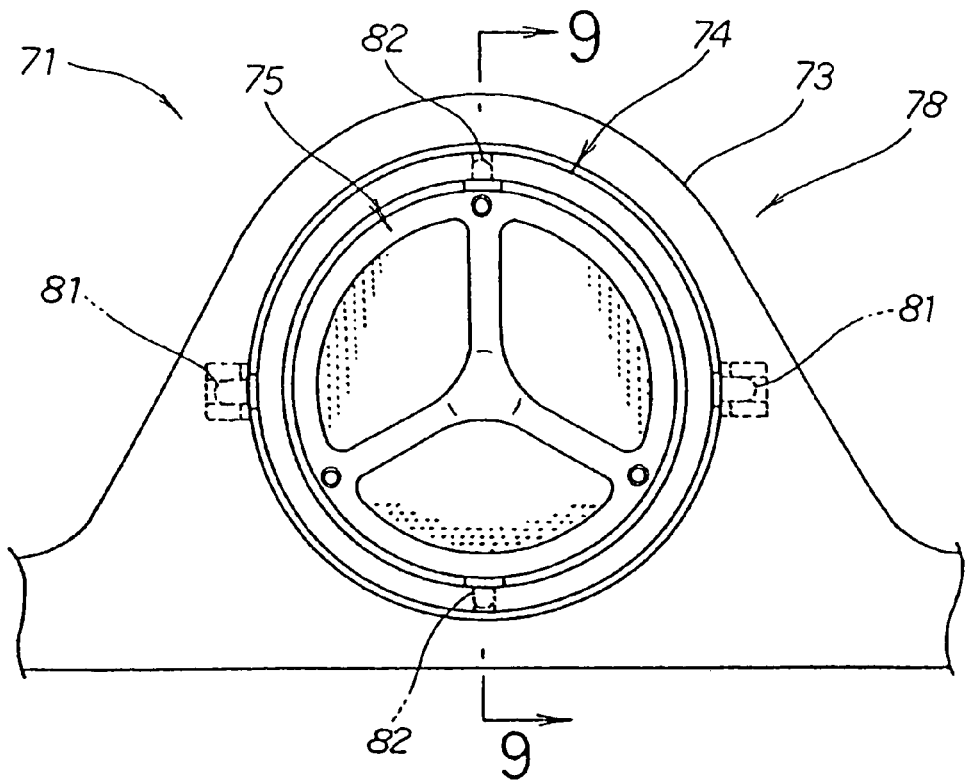
FIG. 8 is a front view of a tweeter speaker assembly of the acoustic system for the motorcycle according to the second embodiment of the present invention.

FIG. 8 is a front view of the tweeter speaker assembly of the acoustic system for the motorcycle according to the second embodiment of the present invention. The left tweeter speaker assembly 71 is configured in such a manner that the ring-shaped baffle 74, which also acts as a speaker supporting member, is mounted to the cover member 73 so as to be capable of swinging in the vertical direction. Specifically, the baffle 74 includes horizontal pins 81, 81 for being rotatably supported by the cover member 73. Additionally, the tweeter unit 75 is mounted to the baffle 74 so as to be capable of swinging in the lateral direction. Specifically, the tweeter unit 75 includes vertical pins 82, 82 for being rotatably supported by the baffle 74.

Figure 9:
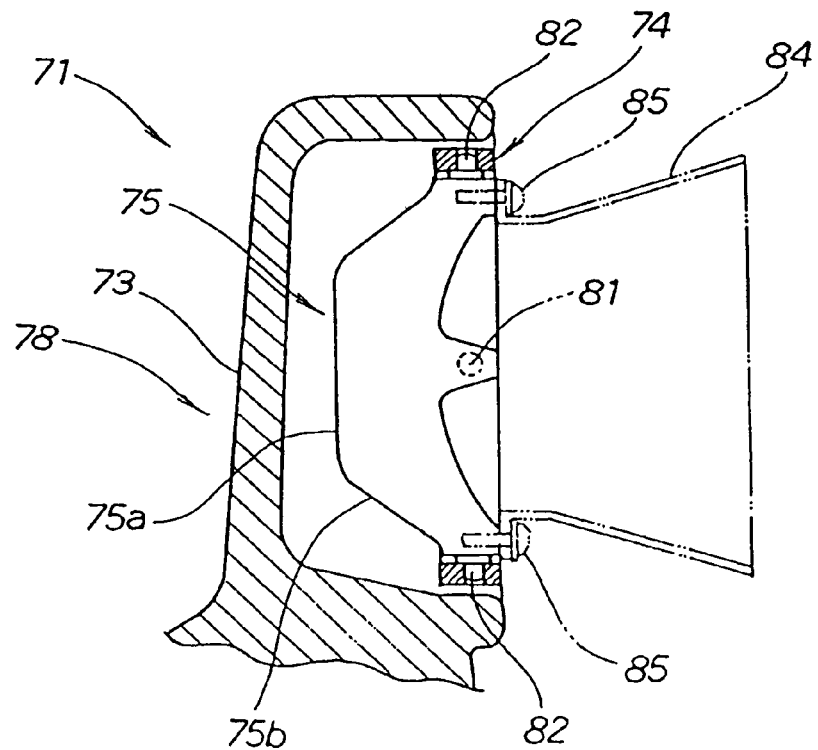
FIG. 9 is a cross-sectional view taken along the line 9-9 in FIG. 8.

The left tweeter speaker assembly further comprises a horn-shaped duct 84 detachably attached to a front surface thereof using screws 85 received within screw holes 83 as shown in FIG. 9. FIG. 9 is a cross-sectional view of the tweeter speaker assembly 71 taken along line 9-9 in FIG. 8. The duct 84 prevents sound diffusion on the front surface of the tweeter unit 75. In FIG. 9, reference numeral 75a represents the bottom portion of the tweeter unit 75, reference numeral 75b is a side surface of the tweeter unit 75. The tweeter speaker assembly 71 is covered by the cover members 73, 73 on the side surface 75a and the bottom 75b of the tweeter unit 75

The right tweeter speaker assembly 72 has the same structure as the left tweeter speaker assembly 71.

FIGS. 10(a)-(d) are drawings that explain the swinging operation of the tweeter unit of the acoustic system for the motorcycle according to the second embodiment of the present invention.

Figure 10:
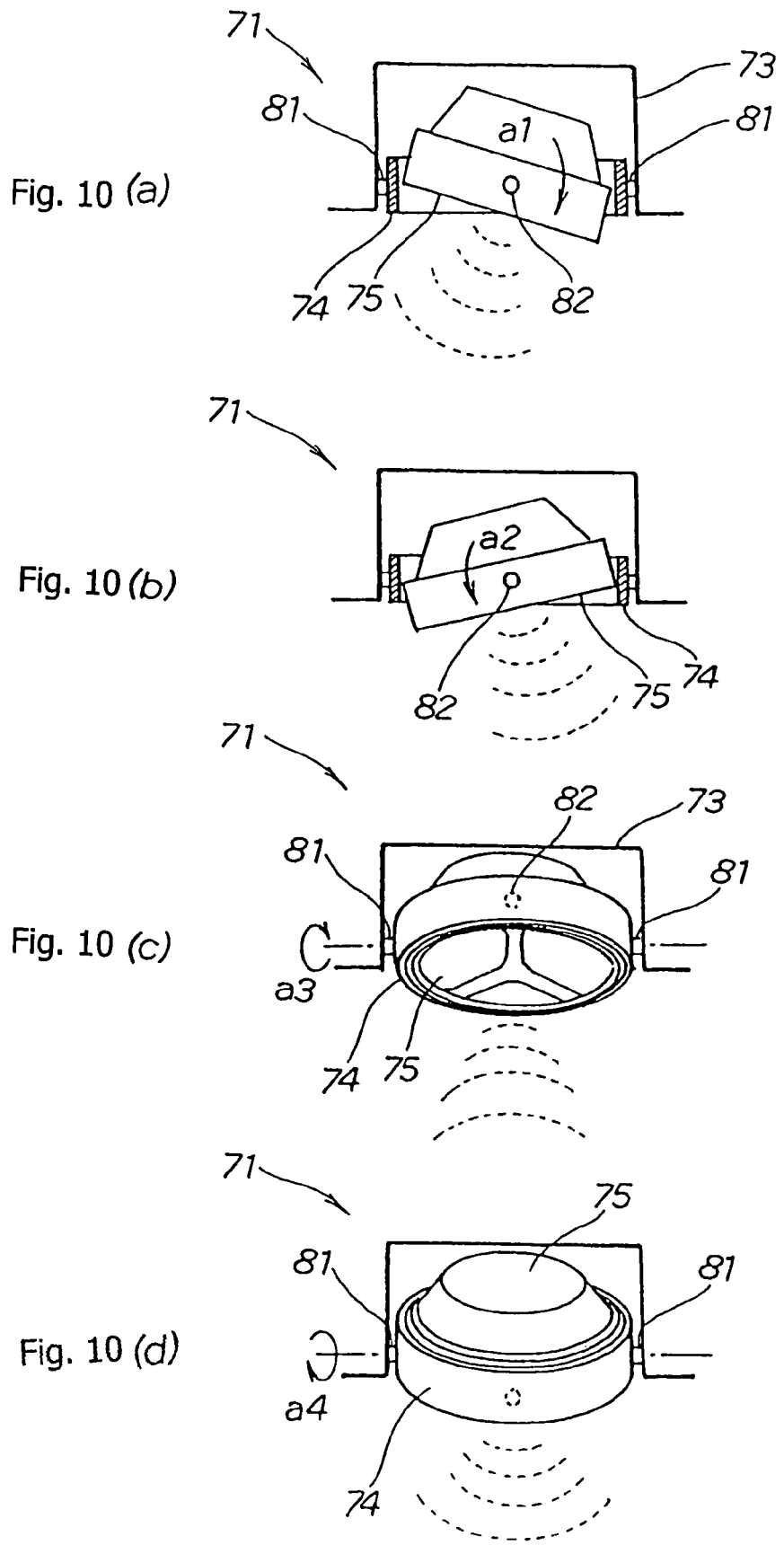
FIG. 10a is a drawing for explaining the swinging operation of the tweeter unit of the acoustic system for the motorcycle according to the second embodiment of the present invention, wherein by rotating the speaker about a vertical shaft according to arrow a1, the sound can be directed toward the left.
FIG. 10b is a drawing for explaining the swinging operation of the tweeter unit of the acoustic system for the motorcycle according to the second embodiment of the present invention, wherein by rotating the speaker about a vertical shaft according to arrow a2, the sound can be directed toward the right.
FIG. 10c is a drawing for explaining the swinging operation of the tweeter unit of the acoustic system for the motorcycle according to the second embodiment of the present invention, wherein by rotating the speaker about a horizontal shaft according to arrow a3, the sound can be directed downward.
FIG. 10d is a drawing for explaining the swinging operation of the tweeter unit of the acoustic system for the motorcycle according to the second embodiment of the present invention, wherein by rotating the speaker about a horizontal shaft according to arrow a4, the sound can be directed upward.

As shown in FIG. 10(a), by rotating the tweeter speaker 75 as shown by an arrow a1 about vertical shafts 82, 82 (one of the numerals 82 is not shown), the high-note sound can be directed toward the left side of the vehicle.

As shown in FIG. 10(b), by rotating the tweeter speaker 75 as shown by an arrow a2 about the vertical shafts 82, 82 (one of the numerals 82 is not shown), the high-note sound can be directed toward the right side of the vehicle.

As shown in FIG. 10(c), by rotating the baffle 74 about the horizontal shafts 81, 81 as indicated by an arrow a3, the high-note sound can be directed upward.

As shown in FIG. 10(d), by rotating the baffle 74 about the horizontal shafts 81, 81 as indicated by an arrow a4, the high-note sound can be directed downward.

In other words, since the ring-shaped baffle (speaker supporting member) 74 which is capable of swinging in the vertical direction is mounted to the cover member 73, and the tweeter unit 75 is mounted to the baffle 74 so as to be capable of swinging in the lateral direction, the direction of the tweeter unit 75 can be changed arbitrary in accordance with the posture of the operator. Consequently, the tweeter unit 75 can be set to direct sound in a preferred direction.

Figure 11A:
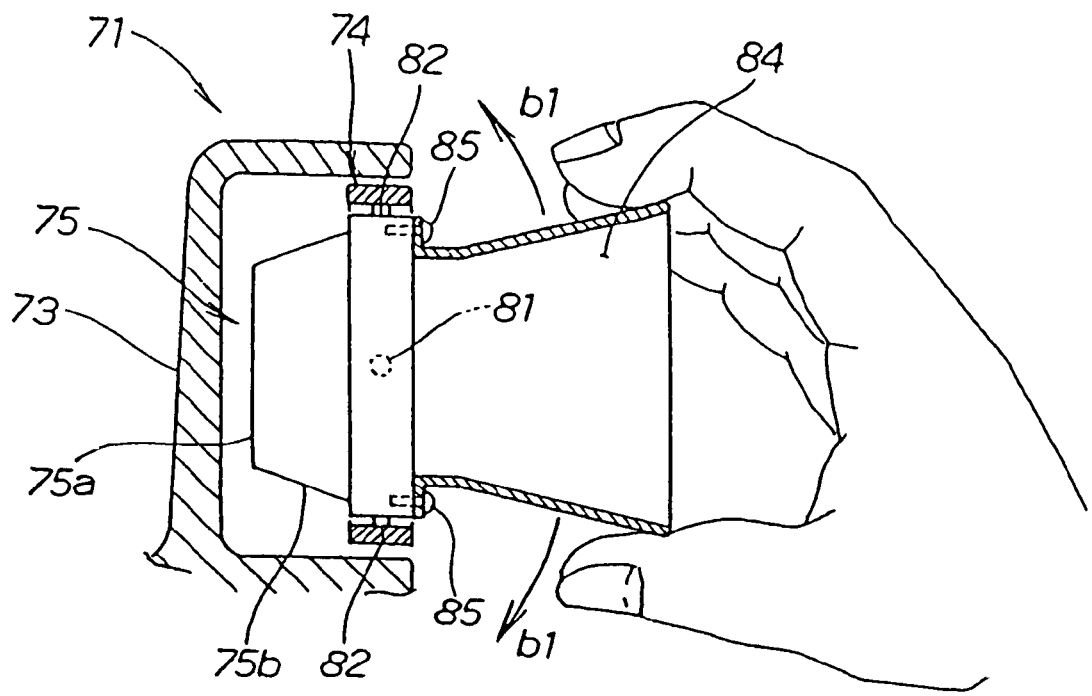
FIG. 11a is a drawing for explaining the attachment/detachment operation of a duct of the tweeter unit of the acoustic system for the motorcycle according to the second embodiment of the present invention, wherein the duct is shown detachably attached to the speaker housing.

FIGS. 11(a), (b) are drawings that explain the operation of the tweeter unit of the acoustic system for the motorcycle according to the second embodiment of the present invention.

FIG. 11(a) shows the tweeter speaker assembly 71 in a state in which the duct 84 for preventing sound diffusion is detachably attached to the front surface of the tweeter unit 75 using screws 85.

The tweeter speaker assembly 71 can emphasize the high-note sound by attaching the duct (horn) 84 on the front surface of the tweeter unit 75 to prevent sound diffusion at this location. In addition, the tweeter unit 75 can be selectively oriented in the directions as indicated by the arrows b1, b1 and the tweeter unit 75 can be set to a desired direction by the operator by manually positioning the duct 84. Thus, the orientation of the tweeter unit 75 is easily changed.

Figure 11B:
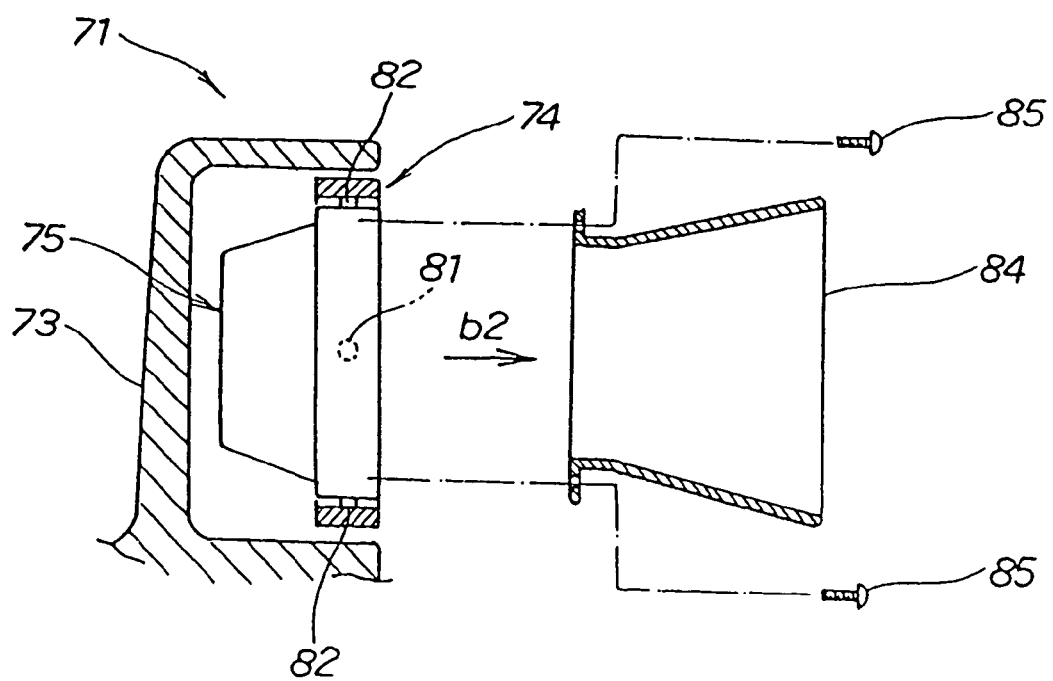
FIG. 11b is a drawing for explaining the attachment/detachment operation of a duct of the tweeter unit of the acoustic system for the motorcycle according to the second embodiment of the present invention, wherein the duct is shown detached from the speaker housing as a result of removal of screws.

As shown in FIG. 11(b), by loosening the mounting screws 85, the duct 84 can be removed as indicated by an arrow b2. In other words, the mode of the tweeter unit 75, that is, operation with the duct 84 or without the duct 84, can be selected, and hence the preference properties of the acoustic system 70 are increased.

The motorcycle navigation system 100 will be described below.

Figure 12:
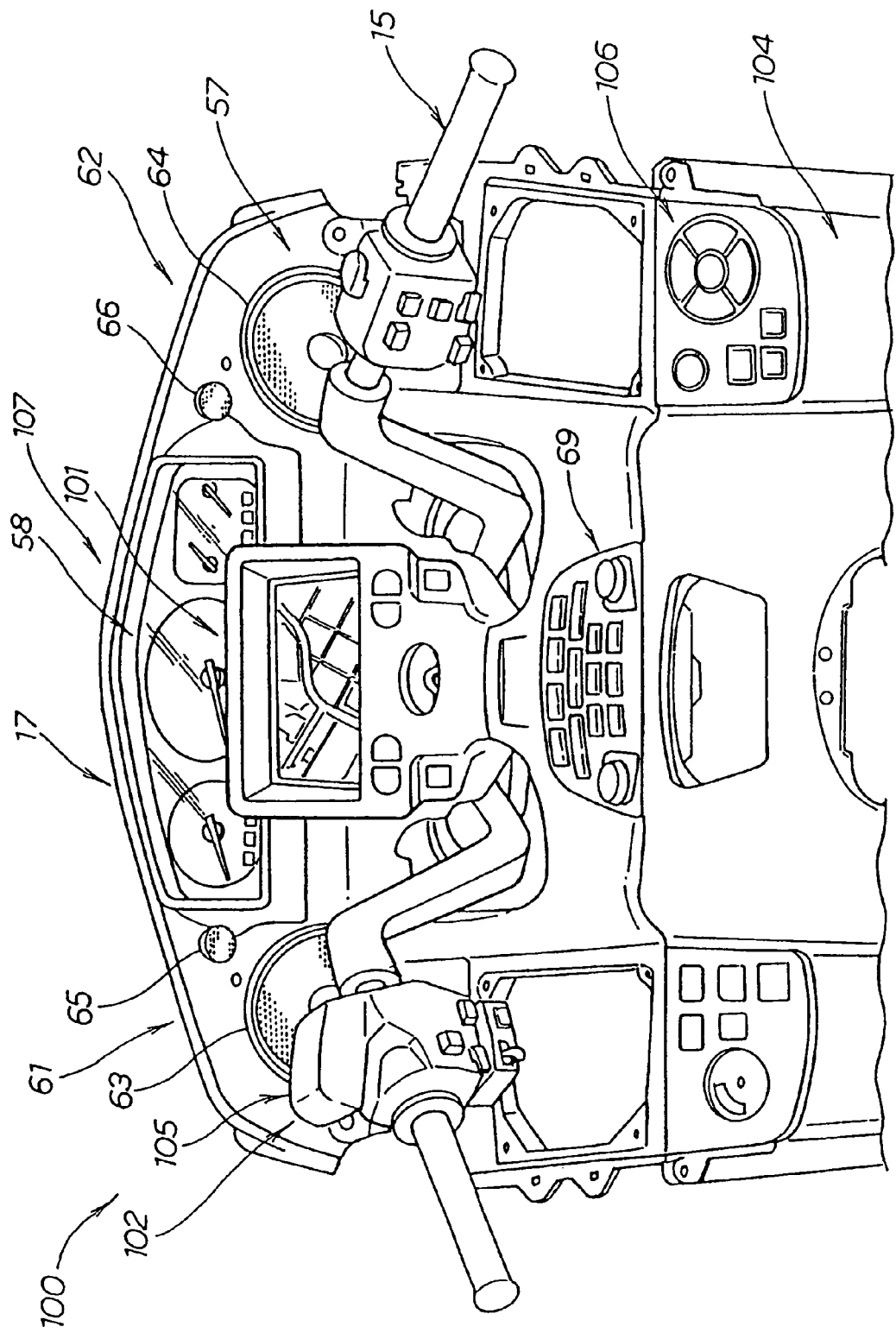
FIG. 12 is a perspective view of the motorcycle navigation system according to the present invention as seen from the view of the operator.

FIG. 12 is a perspective view of the motorcycle navigation system according to the present invention. The motorcycle navigation system 100 includes the navigation display unit 101 disposed behind the meter display unit 58 such that the navigation display unit 101 is between the meter display and the operator. The operating element 102, divided into sections, is arranged around the steering handle 15 and the upper panel 104, and the control unit 103 (see FIG. 2) is stored in the trunk box 39.

The operating element 102 includes a main control box 105 and a sub control box 106. The main control box 105 is mounted to the left part of the steering handle 15 so that the operator can operate control switches mounted thereon during vehicle operation. The sub control box 106 is mounted to the upper panel 104, and is intended to be accessed by the operator when the motorcycle is stopped.

Figure 13:
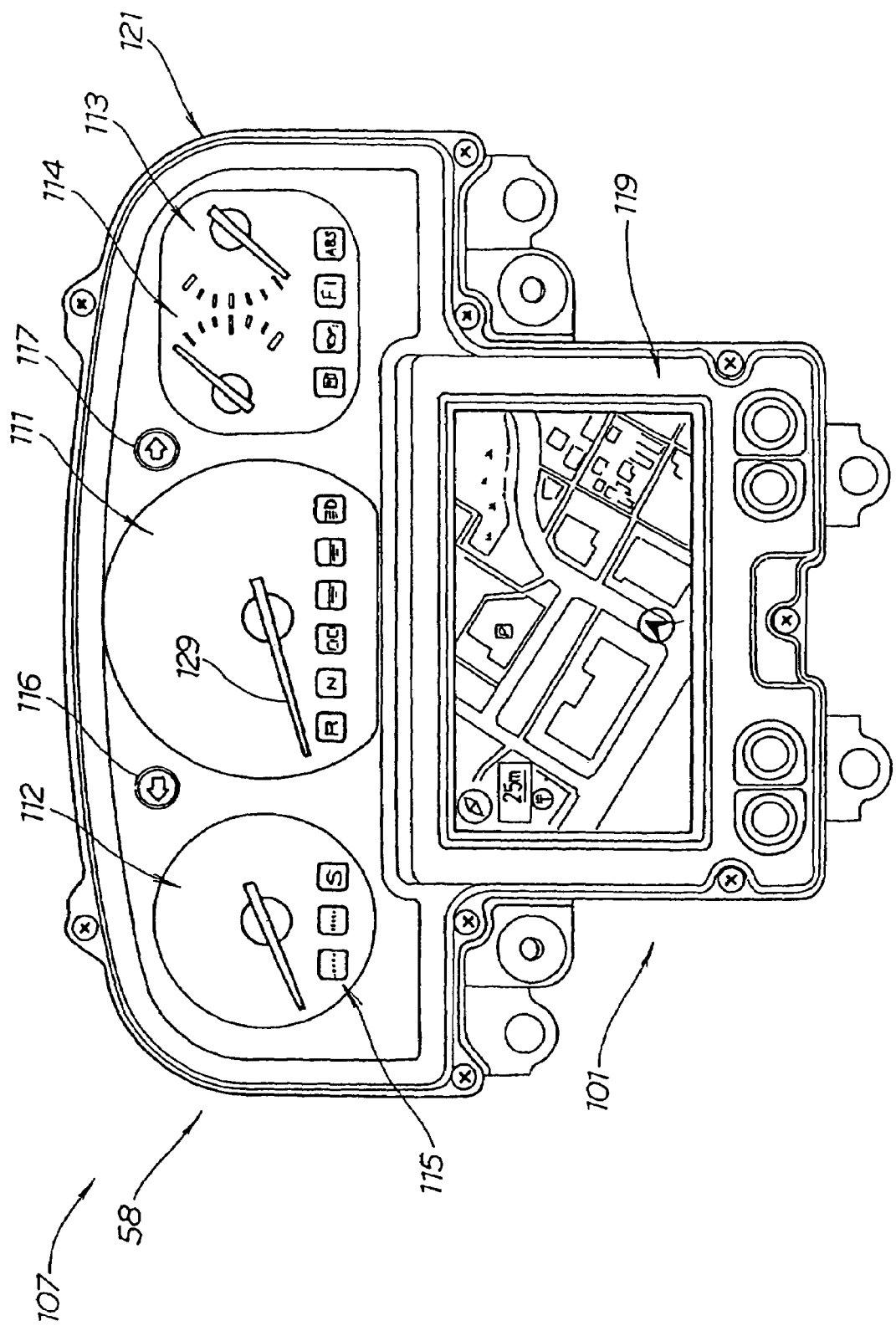
FIG. 13 is an isolated front view of a meter display unit and a navigation display unit of the motorcycle navigation system according to the present invention, showing the frame body framing the navigation display unit independently of the meter display unit.

FIG. 13 is a front view showing the meter display unit 58 of the motorcycle navigation system and the navigation display unit 101 according to the present invention. The meter display unit (vehicle meter) 58 provides a speedometer 111 for displaying the vehicle speed, a tachometer 112 for displaying the number of engine revolutions in a given period of time, a coolant temperature meter 113 for displaying the temperature of cooling water, a fuel meter 114 for displaying the residual quantity of fuel, warning marks 115 for giving a warning or calling the operator's attention, and left and right turn indicator marks 116, 117 for showing the turn indicator illumination state. The internal structure of the meter display unit 58 will be described in conjunction with FIG. 15.

The navigation display unit 101 displays not only navigation information such as the destination or the current vehicle position, but also provides warnings for giving warning information or obtaining the operator's attention, or displays audio information of the component 69 (see FIG. 12). The internal structure of the navigation display unit 101 will be described in conjunction with FIG. 15.

Figure 14:
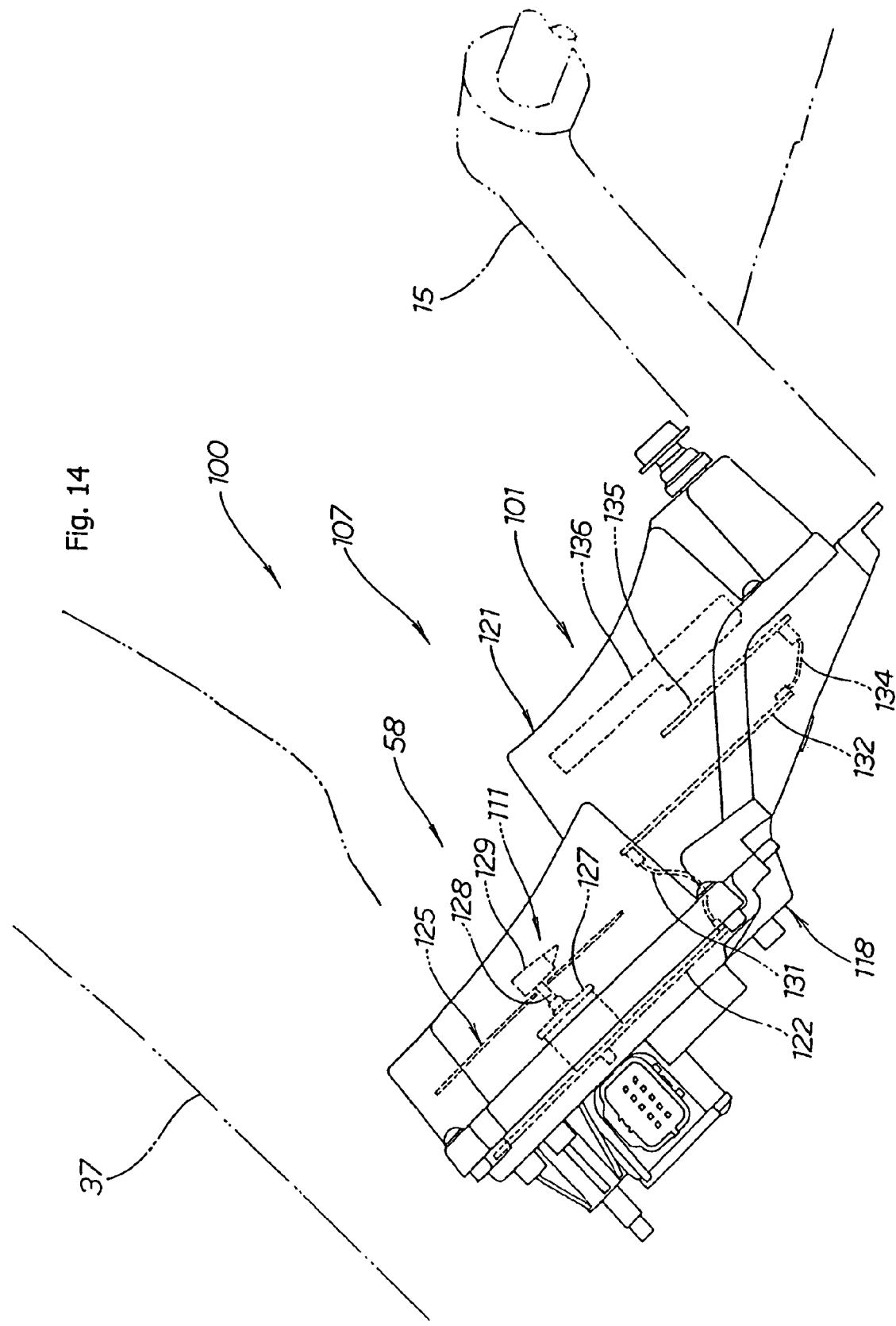
FIG. 14 is a side view of the meter display unit and the navigation display unit of the motorcycle navigation system according to the present invention showing the navigation display unit protruding in the direction of the rear of the vehicle relative to the meter display unit.

FIG. 14 is a side view of the meter display unit 58 of the motorcycle navigation system 100 and the navigation display unit 101 according to the present invention, showing the arrangement relation of the meter display unit and the navigation display unit.

The motorcycle navigation system 100 in the motorcycle 10 (see FIG. 1) includes the meter display unit 58 for displaying drive information such as a vehicle speed or a travel distance and the navigation display unit 101 for displaying the destination or the current vehicle position. It also includes a transparent panel 121 for covering both the meter display unit 58 and the navigation display unit 101 so as to permit the operator to view the meter displays therethrough. The motorcycle navigation system 100 is characterized in that the navigation display unit 101 is disposed behind the meter display unit 58 with respect to the front of the vehicle, so that the navigation display unit 101 protrudes toward the rear of the vehicle relative to the meter display unit 58.

In other words, by disposing the navigation display unit 101 behind the meter display unit 58 and disposed so as to protrude with respect to the meter display unit 58, for example, the operator can both easily hear the sound of the speakers 61, 62 (see FIG. 5) and easily view the meter display unit.

By covering both the meter display unit 58 and the navigation display unit 101 with a single transparent panel 121 which permits the displays to be viewed therethrough, the meter display unit 58 and the navigation display unit 101 are protected from external moisture. Consequently, the sealing property of the meter display unit 58 and the navigation display unit 101 is improved.

Figure 15:
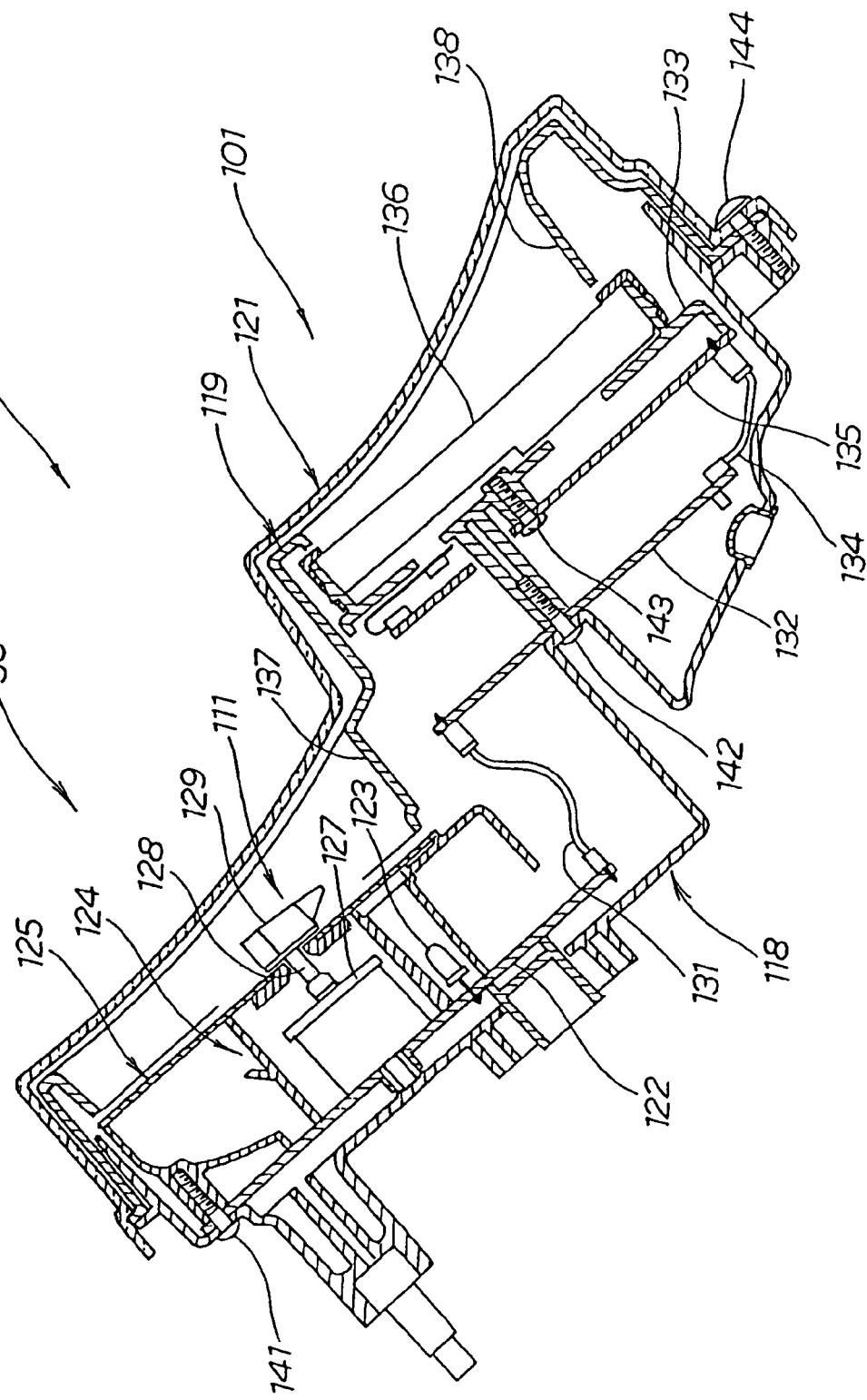
FIG. 15 is a cross-sectional side view of the meter display unit and the navigation display unit of the motorcycle navigation system according to the present invention showing the meter display unit and the navigation display unit enclosed between the housing and the transparent panel.

FIG. 15 is a cross-sectional side view of the meter display unit 58 and the navigation display unit 101 of the motorcycle navigation system 100 according to the present invention, showing the internal structure of the meter display unit 58 and the navigation display unit 101. As best seen in FIG. 15, the navigation display unit 101 is located along a lower edge of, and is integrally connected to the meter display unit 58. The meter display unit 58 and the navigation display unit 101 are offset in a stair-step like manner, as shown, such that the components do not overlap each other in side view. The navigation unit 101 juts upwardly and rearwardly from the meter unit 58, while they are both disposed under the single transparent panel 121 and integrated within the display unit 107.

A display unit 107 includes the meter display unit (vehicle meter) 58 described above and the navigation display unit 101 described above. The display unit 107 also includes a housing 118 for integrally accommodating the meter display unit 58 and the navigation display unit 101, a frame body 119 for providing a distinguishing difference in appearance between the meter display unit 58 and the navigation display unit 101, and a transparent panel 121 which covers the housing 118. The transparent panel 121 covers each of the meter display unit 58, the navigation display unit 101, and the frame body 119 so that these components are seen therethrough. The transparent panel 121 extends so as to surround a peripheral edge of the housing 118.

The meter display unit 58 includes a meter control substrate 122 mounted to the housing 118. The speedometer 111 is mounted on the meter control substrate 122. The tachometer 112 (see FIG. 13), the coolant temperature meter 113, and the fuel meter 114 are mounted on the meter control substrate 122. Plural Light Emitting Diodes (LEDs) 123 (only one is shown) for illuminating the warning marks 115 (see FIG. 13) and the left and right turn indicator marks 116, 117 are also mounted on the meter control substrate 122. A partitioning holder 124 is mounted on the meter control substrate 122 for partitioning the speedometer 111, the tachometer 112, the coolant temperature meter 113, the fuel meter 114, and the LEDs 123. A character display plate 125, which indicates the characters and the warning marks 115 of such as the speedometer 111, is mounted on the partitioning holder 124.

The speedometer 111 includes a step motor 127 mounted on the meter control substrate 122, and an indicating needle 129 is mounted to a shaft 128 of the step motor 127 and is rotatably placed on the character display plate 125. The tachometer 112, the coolant temperature meter 113, and fuel meter 114 shown in FIG. 13 are components which are substantially structurally the same as the speedometer 111.

The navigation display unit 101 includes a navigation control substrate 132 mounted to the housing 118 and connected to the meter control substrate 122 via a first harness 131. A liquid crystal holder 133 is supported on the housing 118 via the navigation control substrate 132. A liquid crystal substrate 135 is connected to the navigation control substrate 132 via a second harness 134 and is supported by the liquid crystal holder 133. A liquid crystal panel 136 is connected to the liquid crystal substrate 135 and is placed on the liquid crystal holder 133.

The frame body 119 includes a meter opening 137 for exposing the meter display unit 58, and a liquid crystal opening 138 for exposing the navigation display unit 101.

As shown in FIG. 15, the display unit 107 includes a mounting screw 141 for mounting the meter control substrate 122 to the housing 118, a mounting screw 142 for tightening the navigation control substrate 132 and the liquid crystal holder 133 together to the housing 118. A mounting screw 143 is used to mount the liquid crystal substrate 135 to the liquid crystal holder 133, and a mounting screw 144 is used to mount the transparent panel 121 to the housing 118.

In other words, the motorcycle navigation system 100 includes the meter display unit 58 and the navigation display unit 101 formed integrally and covered by the transparent panel (panel) 121. The motorcycle navigation system 100 is provided with the frame body 119 for displaying within the single transparent panel 121 the navigation display unit 101 independently in appearance from the meter display unit 58. In particular, the frame body 119 frames the navigation display unit 101 independently from the meter display unit 58 so as to distinguish the appearance of the navigation display unit 101 from the meter display unit 59. As a result of arranging the navigation display unit 101 together with the meter display unit 58 while providing an independent appearance, the internal structure of the electrical circuits of the meter display unit 58 and the navigation display unit 101 can be bundled together. Consequently, a reduction in the cost of the meter display unit 58 and the navigation display unit 101 is achieved.

Figure 16:
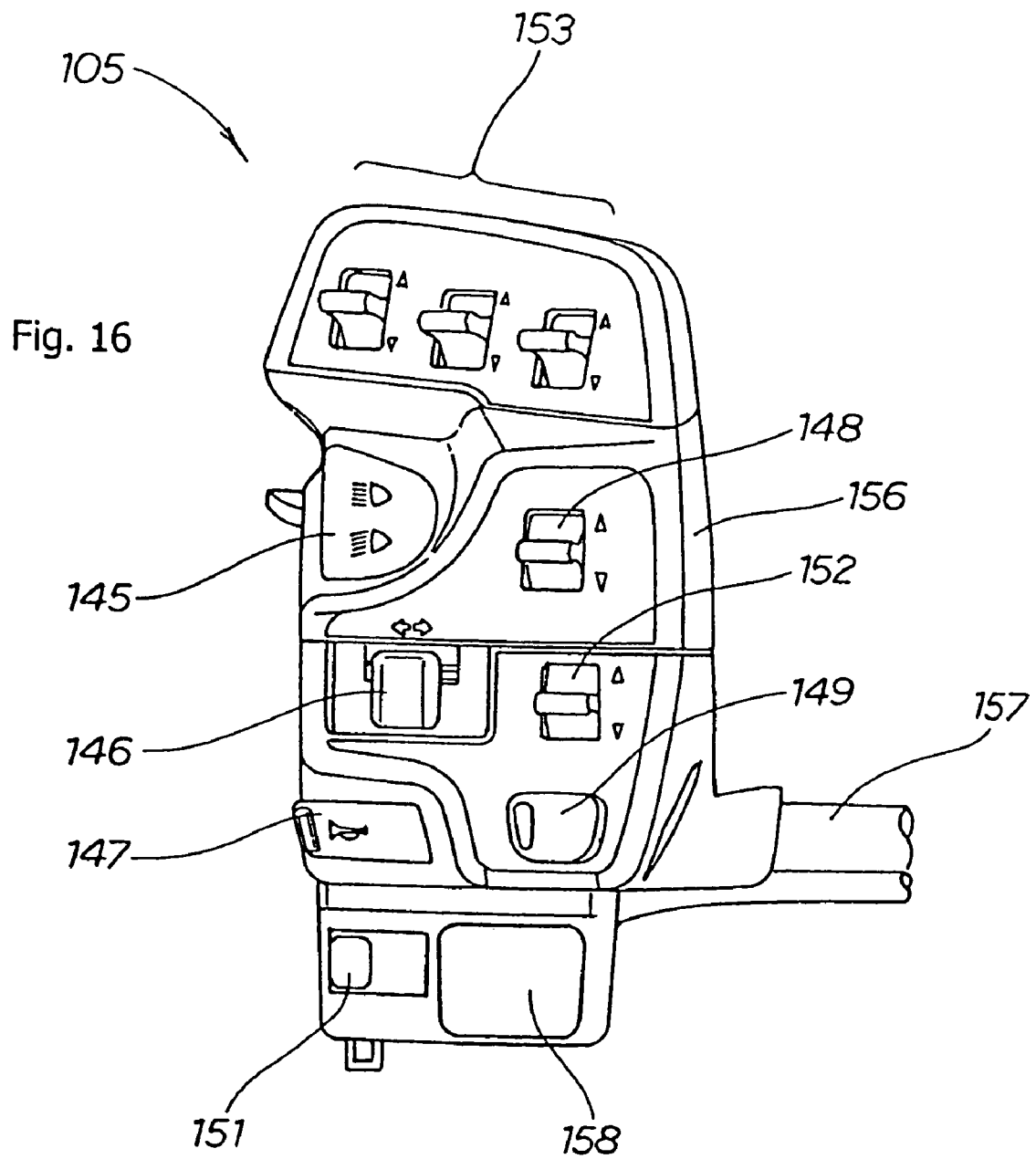
FIG. 16 is a front view of a main control box of the motorcycle navigation system according to the present invention.

FIG. 16 is a front view of the main control box 105 of the motorcycle navigation system according to the present invention. The main control box 105 is an operating element having control buttons or levers arranged thereon to be actuated during vehicle operation. The main control box 105 includes a light control button 145 for illuminating the head lights 18, 18 (see FIG. 3) or the tail lamps 44, 44 (see FIG. 4), and a turn indicator sliding tab 146 for operating the left and right front turn indicators 36, 36 (see FIG. 3), and the left and right rear turn indicators 42, 42 (see FIG. 4). The main control box 105 also includes a horn switch button 147 for sounding the horn (not shown), a volume lever 148 for adjusting the volume level of the component 69 (see FIG. 12) or the navigation system 100, a mute button 149 for temporarily reducing the volume level of the component 69 or the navigation system 100 downward, a map guide button 151 used when using a voice guide function of the navigation system 100, a tuning/disk button 152 for selecting the broadcasting station or the track number of the disk such as a CD on the component 69, and an amateur radio lever 153 for operating the amateur radio (not shown) arranged therein.

The voice guide function is, for example, a function permitting an audible announcement that the motorcycle is approaching a railroad crossing, or approaching a desired destination.

As seen in FIG. 16, the main control box 105 further includes a main control box body 156, a main control cable 157 extending from the control box body 156, and a print display unit 158 of the map guide button 151.

Figure 17:
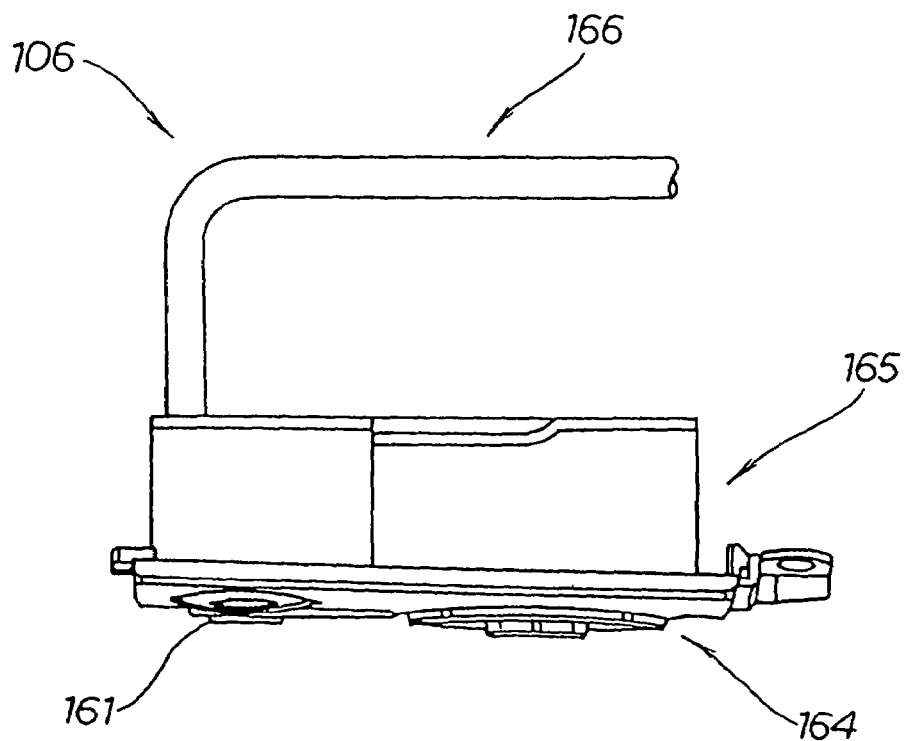
FIG. 17 is a front view of a sub control box of the motorcycle navigation system according to the present invention.
Figure 18:
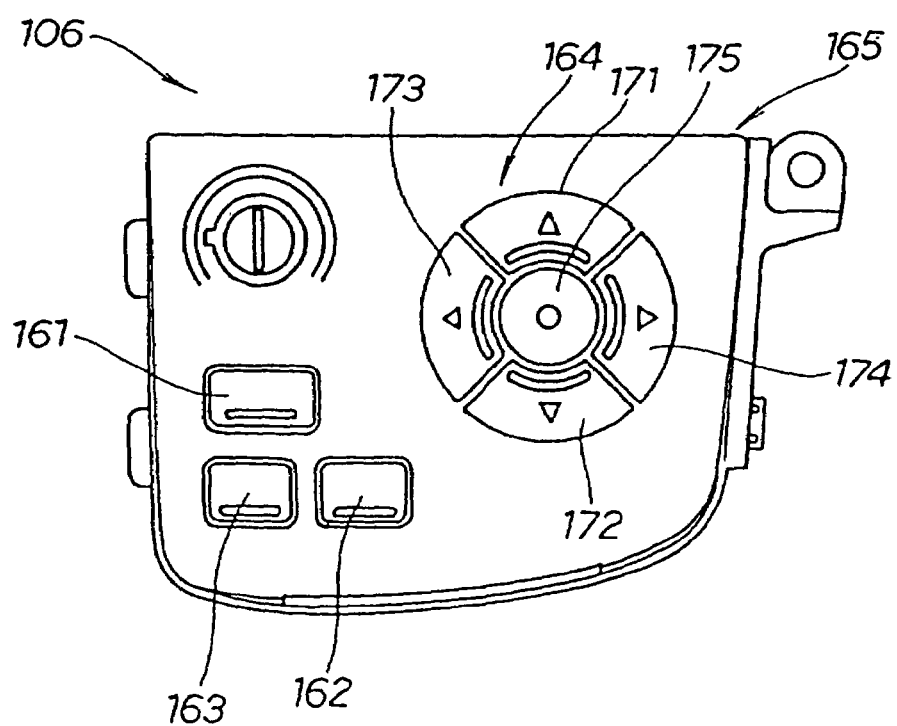
FIG. 18 is a plan view of the sub control box of FIG. 17.

FIG. 17 is a front view of the sub control box 106 of the motorcycle navigation system 100 according to the present invention, and FIG. 18 is a plan view of the sub control box 106 of FIG. 17. The sub control box 106 is an operating part which houses control buttons or levers that are intended to be actuated when the motorcycle is stopped. As shown in FIG. 18, the sub control box 106 includes a menu button 161 for displaying a route guide or various setting details, a cancel button 162 for canceling the selected item, a map button 163 for displaying a highway map or a town map, a selecting and deciding button 164 for selecting and deciding menu or map displayed by the menu button 161 or the map button 163, a sub control box body 165 for arranging these buttons 161-164, and a sub control cable 166, shown in FIG. 17, extending from the sub control box body 165. The selecting and deciding button 164 includes selecting buttons 171-174 for selecting the menu or the map, and a deciding button 175 for deciding the selected menu or map.

Figure 19:
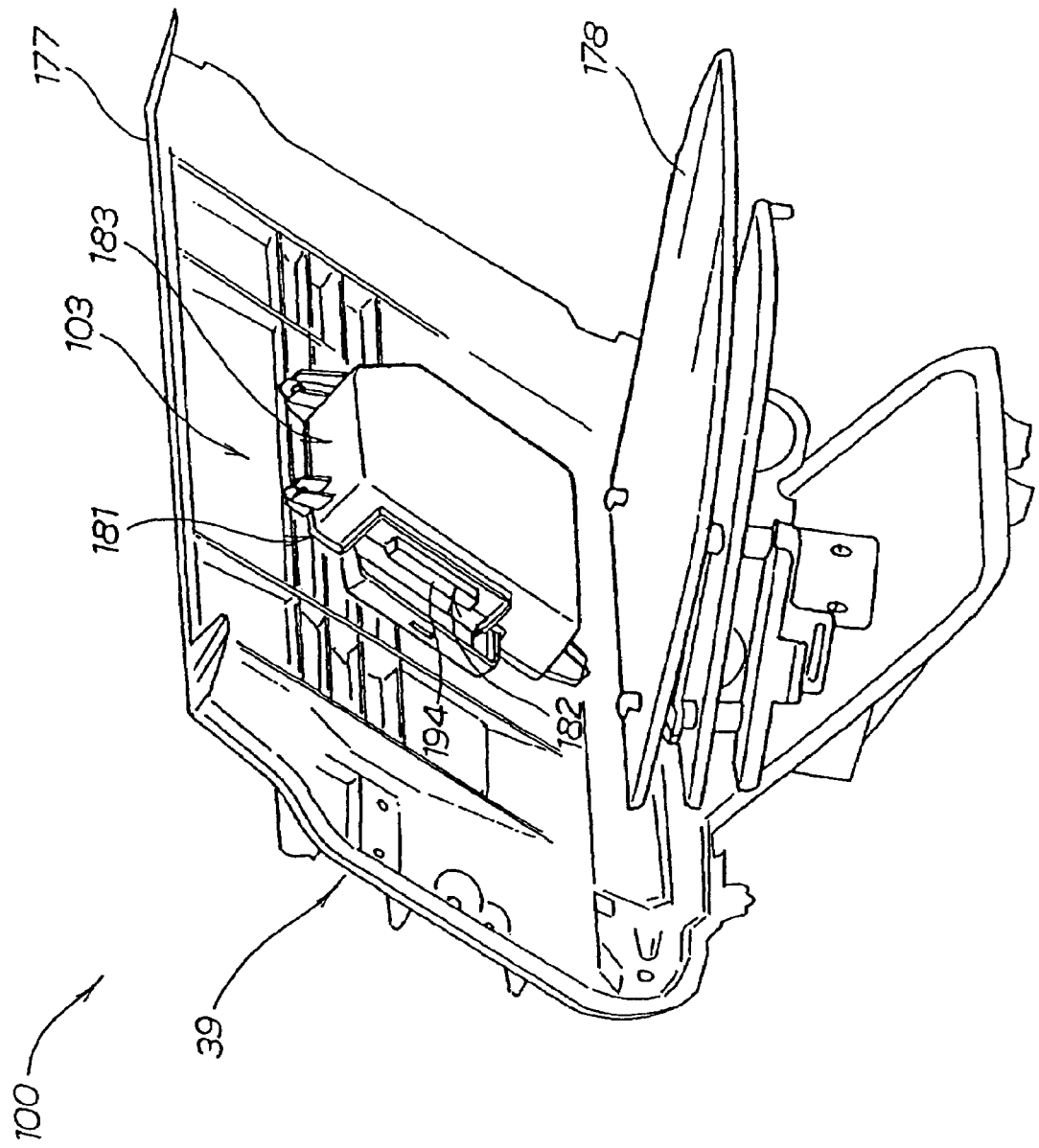
FIG. 19 is a perspective view of the interior of the trunk box showing the control unit mounted to an interior surface side wall of the trunk box.

FIG. 19 is a perspective view showing the mounting configuration of the control unit 103 of the motorcycle navigation system 100 according to the present invention. As seen in FIG. 19, the control unit 103 is located within the trunk box 39, which includes a front wall 177, and a bottom plate 178.

In the motorcycle navigation system 100, which includes the navigation display unit 101 (see FIG. 12) for displaying navigation information such as the destination or the current vehicle position, the control unit (controller) 103 for driving the navigation display unit 101, and the operating element 102 (see FIG. 12) which is connected to the control unit 103, the control unit 103 is disposed in the trunk box 39 provided in the rear of the vehicle body. By arranging the control unit 103 in the trunk box 39 provided in the rear of the vehicle body, a sufficient space is provided on the instrument panel for arranging the meter display unit 58 (see FIG. 12) and the navigation display unit 101. Consequently, the navigation system 100 is easily mounted to the motorcycle 10 (see FIG. 1).

The control unit 103 is mounted so as to confront and abut the interior surface of the front wall 177 of the trunk box 39. By mounting the control unit 103 along the front wall 177 of the trunk box 39, the control unit 103 can be stored in the trunk box 39 without impairing usability of the trunk box 39. Consequently, the control unit 103 can be stored while assuring the convenient use of the trunk box 39.

Figure 20:
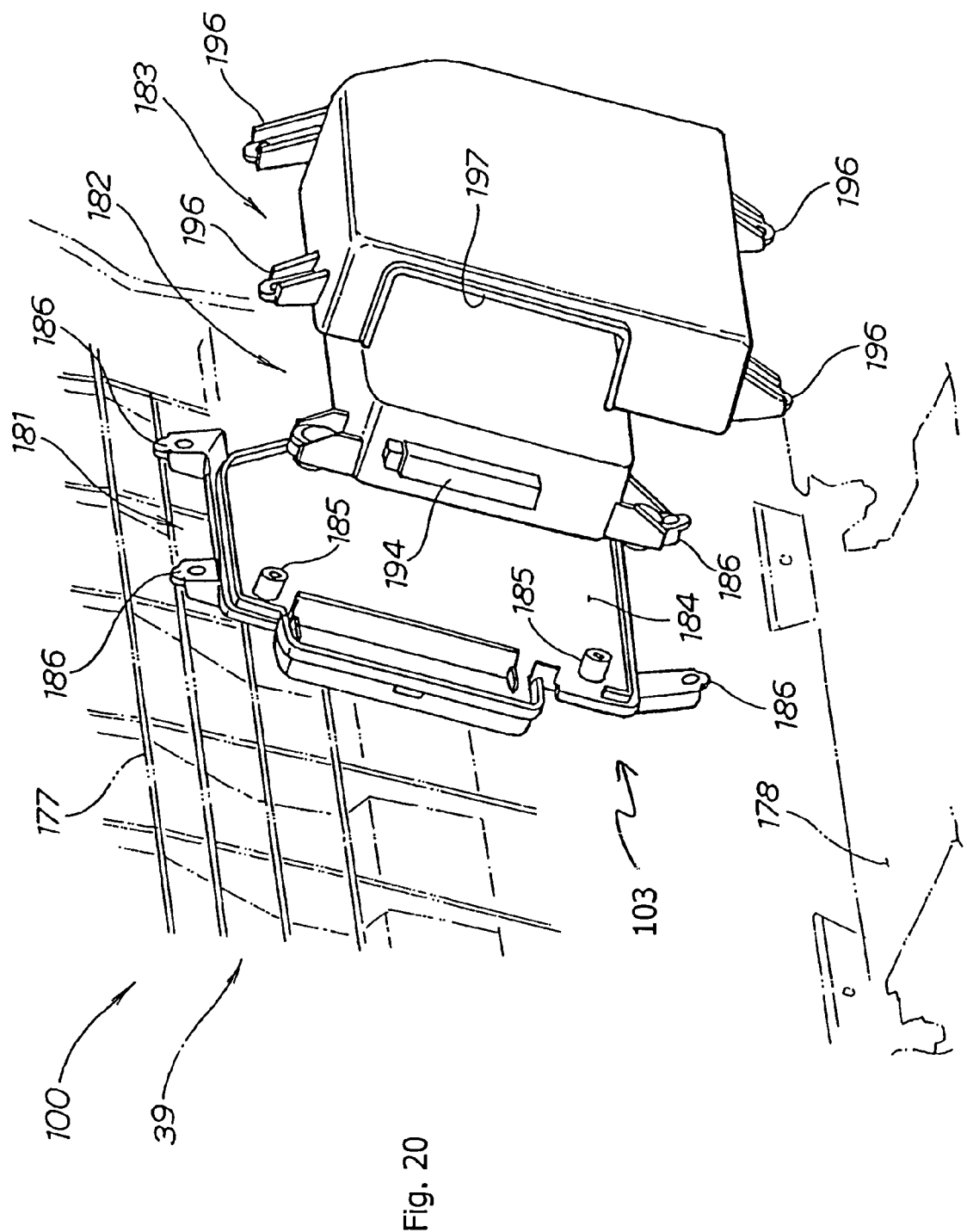
FIG. 20 is an exploded perspective view of the control unit of the motorcycle navigation system according to the present invention.

FIG. 20 is an exploded perspective view of the control unit of the motorcycle navigation system 100 according to the present invention. The control unit 103 includes a base member 181 that abuts and confronts the front wall 177, a unit body 182 which permits positioning of the control unit 103 on the base member 181, and a cover member 183 for covering the unit body 182.

The control unit 103 is fixed to the front wall 177 by sandwiching the unit body 182 between the base member 181 and the cover member 183, and by securing the base member 181 and the cover member 183 both together and to the front wall 177.

By forming the control unit 103 of the base member 181 which abuts the front wall 177, the unit body 182 which positions the control unit 103 on the base member 181, and the cover member 183 which covers the unit body 182, the control unit 103 can be stored within trunk box 39 while maintaining the article-storing capabilities of the trunk box 39.

In securing the base member 181 and the cover member 183 together to the front wall 177, an additional benefit is obtained, for example, when it is necessary to provide vibration control means on the unit body 182. Vibration control is simply achieved by placing a cushion between the base member 181 and the unit body 182, and placing a cushion between the unit body 182 and the cover member 183.

The base member 181, the unit body 182, and the cover member 183 of the control unit 103 will be described below with respect to FIGS. 21-28.

Figure 21:
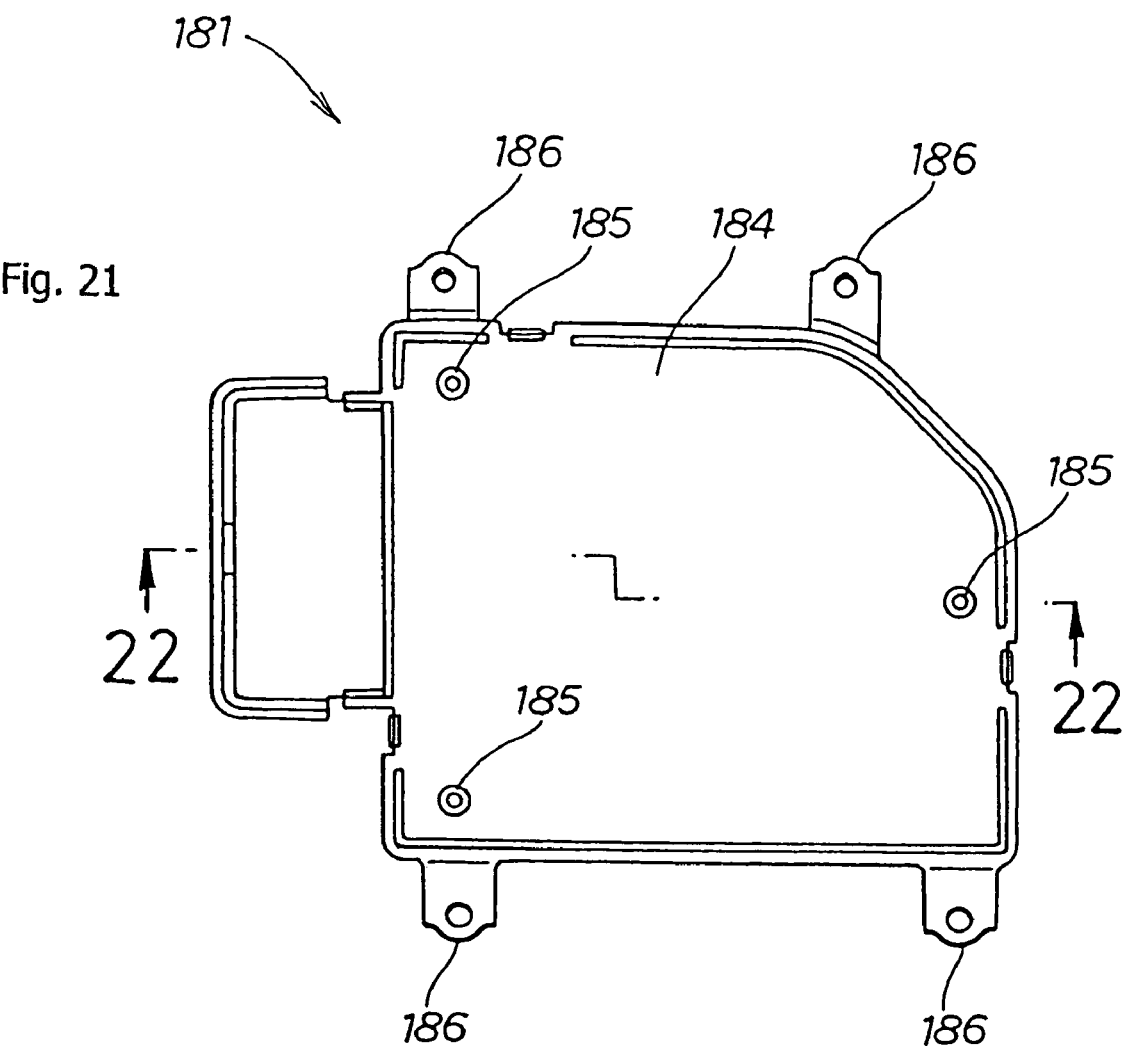
FIG. 21 is a plan view of a base member of the control unit of the motorcycle navigation system according to the present invention.
Figure 22:
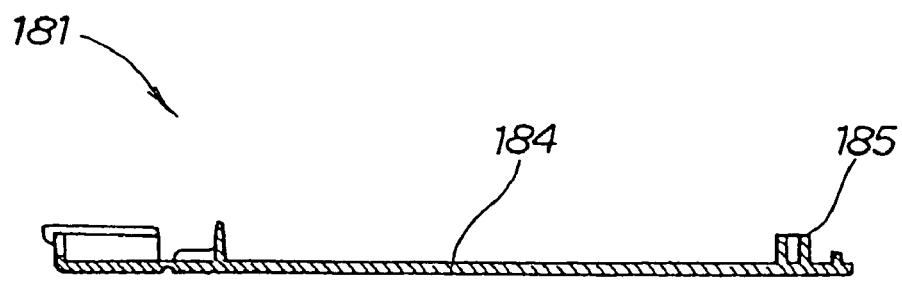
FIG. 22 is a cross-sectional view taken along the line 22-22 in FIG. 21.

FIG. 21 is a plan view of the base member of the control unit in the motorcycle navigation system according to the present invention, and FIG. 22 is a cross-sectional view taken along the line 22-22 in FIG. 21. The base member 181 is a member including a placing portion 184 which receives the unit body 182 (see FIG. 20) thereon, positioning bosses 185 formed on the placing portion 184 for positioning the unit body 182 on the placing portion, and mounting portions 186 to be secured with the cover member 183 (see FIG. 20) to the front wall 177.

Figure 23:
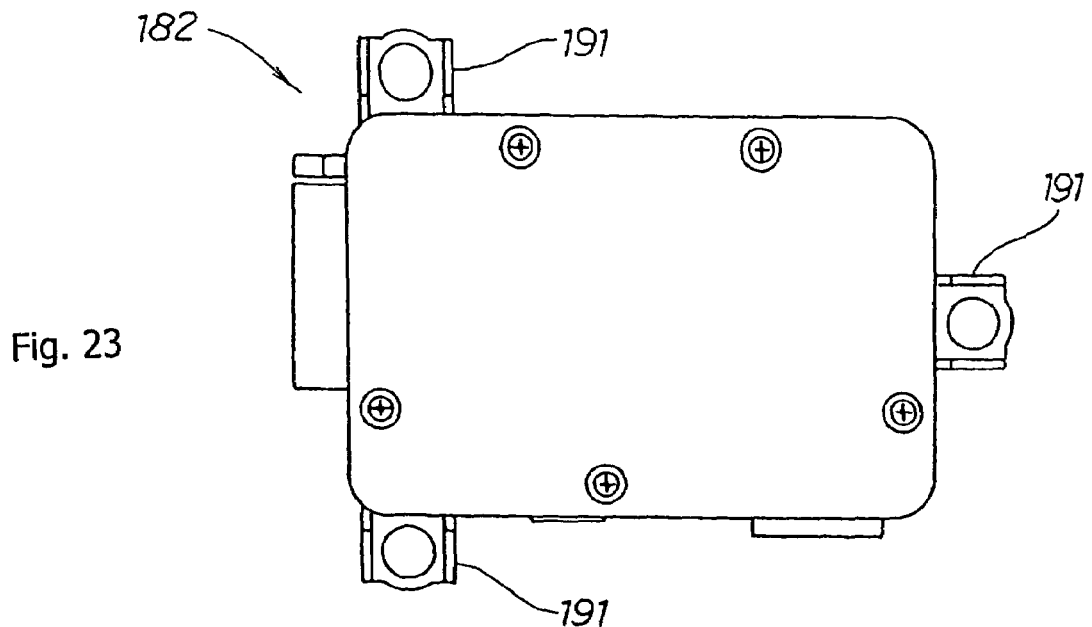
FIG. 23 is a plan view of a unit body of the control unit of the motorcycle navigation system according to the present invention.
Figure 24:
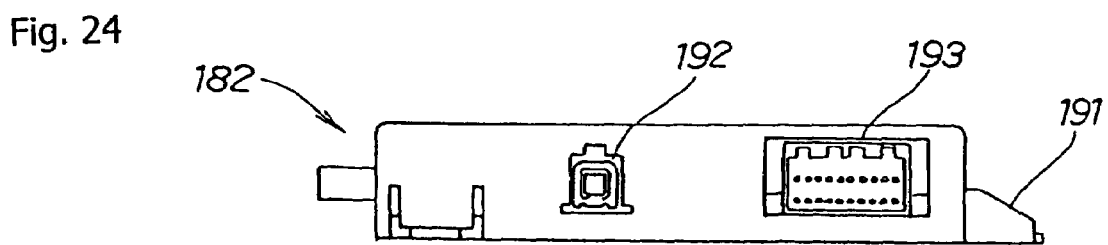
FIG. 24 is a front view of the unit body of the control unit of FIG. 23.
Figure 25:
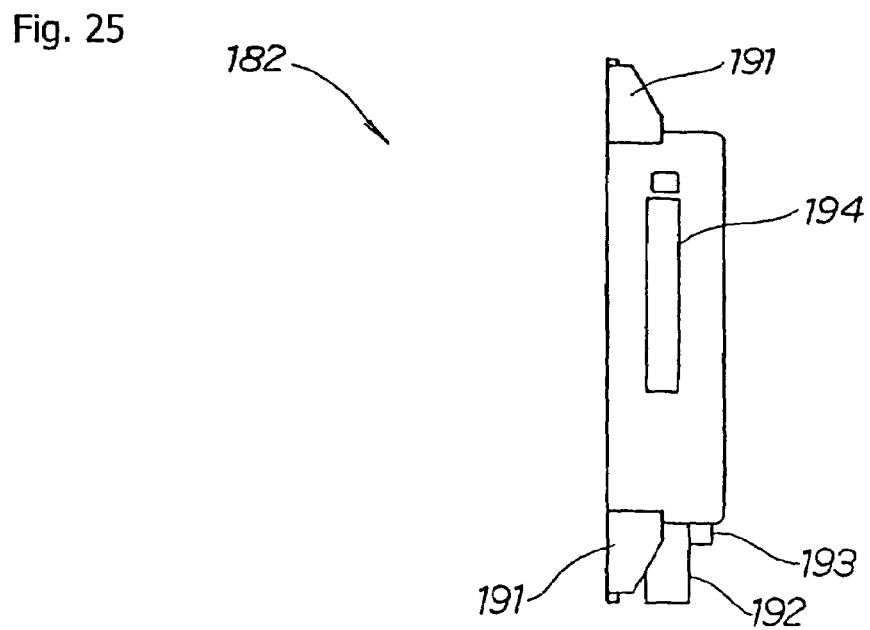
FIG. 25 is a side view of the unit body of the control unit of FIG. 23.

FIG. 23 is a plan view of the unit body 182 of the control unit 103 in the motorcycle navigation system according to the present invention, FIG. 24 is a front view of the unit body 182 of FIG. 23, and FIG. 25 is a side view of the unit body 182 of FIG. 23. The unit body 182 is a portion accommodating a control function, and includes fitting portions 191 to be fitted into the positioning bosses 185 of the base member 181 (see FIG. 21), a connector 192 for connecting to the main control cable 157 (see FIG. 16), a connector 193 for connecting to the sub control cable 166 (see FIG. 17) as shown in FIG. 24, and a connector 194 for connecting a cable (not shown) for connecting to the navigation display unit 101 (see FIG. 12).

Figure 26:
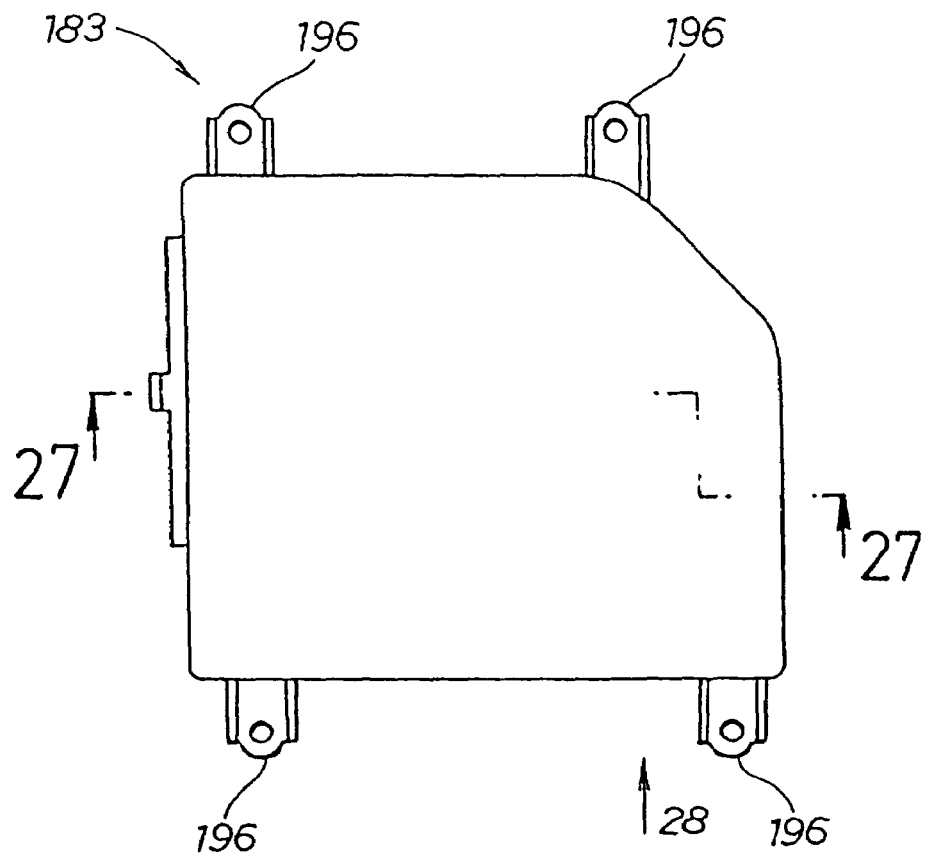
FIG. 26 is a plan view of a cover member of the control unit of the motorcycle navigation system according to the present invention.
Figure 27:
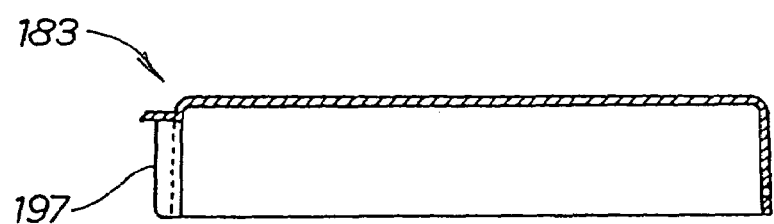
FIG. 27 is a cross-sectional view taken along the line 27-27 in FIG. 26.
Figure 28:
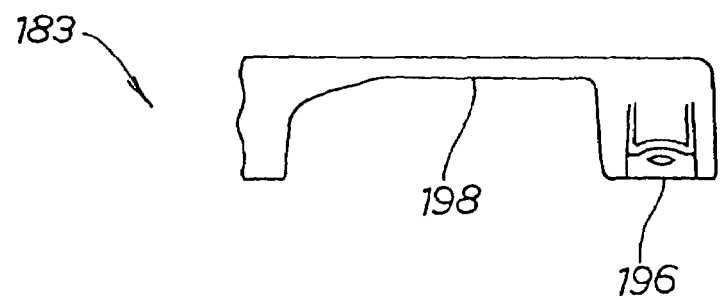
FIG. 28 is a drawing viewed in the direction of an arrow 28 in FIG. 26.

FIG. 26 is a plan view of the cover member 183 of the control unit 103 for the motorcycle navigation system 100 according to the present invention, FIG. 27 is a cross-sectional view taken along the line 27-27 in FIG. 26, and FIG. 28 is a drawing viewed in the direction of an arrow 28 in FIG. 26. The cover member 183 is a cover including mounting portions 196 for mounting the cover member 183 together with the base member 181 to the front wall 177, an opening 197 for exposing the connector 194 (see FIG. 25) of the unit body 182 as shown in FIG. 27, and a notched portion 198 as shown in FIG. 28 for exposing the connectors 192, 193 of the unit body 182 (see FIG. 24).

In the acoustic system 60 for the motorcycle according to the present invention, the two super woofer units (super woofer speakers) 67, 68 are arranged in the trunk box as shown in FIG. 2. However, the invention is not limited thereto, and it is also possible to arrange one single super woofer unit (super woofer speaker) at the center of the vehicle body. The super woofer unit may alternatively be embedded in the seat back of the vehicle seat.

As shown in FIG. 2, in the acoustic system 60 for the motorcycle according to the present invention, the left and right tweeter units 65, 66 and the left and right midrange/woofer units 63, 64 are disposed in the instrument panel 57, and the left and right super woofer units 67, 68 are arranged in the trunk box 39. However, the invention is not limited thereto, and it is also possible to arrange a tweeter unit (tweeter) and a midrange unit (squawker) in the instrument panel 57, and arrange the woofer unit (woofer) in the trunk box 39.

As shown in FIG. 5, in the acoustic system 60 for the motorcycle according to the present invention, the tweeter units 65, 66 are fixed to the instrument panel 57 so as to be directed toward the operator. However, the invention is not limited thereto. As shown in FIG. 8, the tweeter units 65, 66 may be mounted so as to be capable of swinging in the lateral and vertical directions.

As shown in FIG. 8, in the motorcycle acoustic system 70 (see FIG. 7) according to the second embodiment of the present invention, the ring-shaped baffle 74 is mounted to the cover member 74 so as to be capable of swinging in the vertical direction, and the tweeter unit 75 is mounted to the baffle 74 so as to be capable of swinging in the lateral direction. However, the invention is not limited thereto. For example, the tweeter unit 75 may be configured in such a manner that the ring-shaped baffle is attached to the cover member so as to be capable of swinging in the lateral direction, and the tweeter unit 75 is mounted to the baffle so as to be capable of swinging in the vertical direction.

As shown in FIG. 19, the control unit 103 of the motorcycle navigation system 100 according to the present invention is mounted to the front wall 177 of the trunk box 39. However, the invention is not limited thereto. For example, the control unit 103 may be mounted to a wall surface other than the front wall, such as the left and right wall, or the rear wall.

The motorcycle navigation system according to the present invention is preferably employed in a large-sized motorcycle.

While a working example of the present invention has been described above, the present invention is not limited to the working example described above, but various design alterations may be carried out without departing from the spirit and scope of the present invention as set forth in the claims.

What is claimed is:

1. A motorcycle comprising a vehicle navigation system, said vehicle navigation system comprising:
    a meter display unit for displaying information including at least one of a vehicle speed and a travel distance;
    a navigation display unit for displaying an image representing at least one of a destination and a current vehicle position; and
    a main control box which is operatively attached to steering handle of the vehicle so as to be easily reachable by an operator while driving, said main control box comprising a plurality of control switches for use in controlling selected functions of the navigation display unit during vehicle operation;
    wherein the navigation display unit is disposed behind the meter display unit relative to the front of the motorcycle, so that the navigation display unit protrudes rearwardly with respect to the meter display unit.

2. The motorcycle according to claim 1, the motorcycle navigation system further comprising a transparent panel for covering both the meter display unit and the navigation display unit, wherein the meter display unit and the navigation display unit are integrated together within the panel and a frame body, and wherein the frame body frames the navigation display unit independently from the meter display unit so as to distinguish the appearance of the navigation display unit from the meter display unit.

3. The motorcycle according to claim 2, wherein the meter display unit and the navigation display unit are integrated together within a housing and covered by the panel, wherein the panel encloses the periphery of the housing so as to resist entry of moisture between the panel and the housing.

4. The motorcycle according to claim 1, wherein the components are situated such that during operation of the motorcycle by an operator, the navigation display unit is positioned between an operator and the meter display unit;
    and wherein the main control box also comprises additional switches for controlling other vehicle functions in addition to said selected functions of the navigation display unit.

5. The motorcycle according to claim 1, further comprising a controller for the navigation display unit, wherein the controller is positioned at a rear portion of the motorcycle.

6. The motorcycle according to claim 1, wherein the motorcycle further includes an acoustic system, the acoustic system comprising at least one mid-range speaker and at least one high-range speaker, wherein the at least one mid-range speaker and at least one high-range speaker are positioned laterally adjacent to the navigation display unit.

7. The motorcycle according to claim 6, wherein the at least one high range speaker is pivotally mounted to the motorcycle so as to permit both vertical and horizontal adjustment of the orientation of the at least one high range speaker with respect to the motorcycle.

8. The motorcycle of claim 1, further comprising a sub control box spaced away from the main control box, said sub control box comprising a plurality of additional navigation control buttons provided for use by an operator when the vehicle is stopped.

9. A motorcycle navigation system comprising:
   a navigation display unit for displaying navigation information including at least one of a destination and a current vehicle position;
   a control unit for driving the navigation display unit; and
   an operating element connected to the control unit,
   wherein the control unit is disposed in a trunk box provided in the rear of the motorcycle body.

10. The motorcycle navigation system according to claim 9, wherein the control unit is mounted to a side wall surface of the trunk box.

11. The motorcycle navigation system according to claim 9, wherein the control unit includes a base member which abuts and confronts the wall surface, a unit body for positioning the control unit on the base member, and a cover member which covers the unit body, and
   wherein the unit body is fixed to the base member by being sandwiched between the base member and the cover member and by securing the base member and the cover member together to the wall surface.

12. The motorcycle navigation system of claim 9 wherein the navigation system further comprises a meter display unit which displays information including at least one of a vehicle speed and a travel distance, and wherein the navigation display unit is positioned between an operator and the meter display unit.

13. The motorcycle navigation system of claim 9 wherein the navigation system further comprises a meter display unit which displays information including at least one of a vehicle speed and a travel distance, and wherein the navigation display unit and the meter display unit are integrated together within a housing, the housing including a frame body which frames the navigation display unit independently of the meter display unit.

14. The motorcycle navigation system of claim 9 wherein the navigation system further comprises a meter display unit which displays information including at least one of a vehicle speed and a travel distance, and wherein the navigation display unit and the meter display unit are integrated together within a housing, the housing including a single transparent plate which overlies both the navigation display unit and the meter display unit.

15. The motorcycle navigation system of claim 9 wherein the navigation system further includes at least one mid-range speaker and at least one high-range speaker, wherein the at least one mid-range speaker and at least one high-range speaker are positioned laterally adjacent to the navigation display unit.

16. The motorcycle navigation system of claim 9 wherein the at least one high range speaker is pivotally mounted to the motorcycle so as to permit both vertical and horizontal adjustment of the orientation of the at least one high range speaker with respect to the motorcycle.

17. The motorcycle navigation system of claim 9 wherein the navigation system further includes at least one mid-range speaker, at least one high-range speaker, and at least one low range speaker, wherein the at least one mid-range speaker and at least one high-range speaker are positioned laterally adjacent to the navigation display unit which is disposed the front of the motorcycle body, and the at least one low range speaker is disposed in the trunk box provided in the rear of the motorcycle body.

18. The motorcycle of claim 9, further comprising:
   a main control box which is operatively attached to a steering handle of the vehicle so as to be easily reachable by an operator while driving, said main control box comprising a plurality of control switches for use in controlling selected functions of the navigation display unit during vehicle operation; and
   a sub control box spaced away from the main control box, said sub control box comprising a plurality of additional navigation control buttons provided for use by an operator when the vehicle is stopped.

19. The motorcycle of claim 18, wherein the main control box also comprises additional switches for controlling other vehicle functions in addition to said selected functions of the navigation display unit.

20. A motorcycle comprising a vehicle navigation system, said vehicle navigation system comprising:
   a navigation display unit for displaying an image representing at least one of a destination and a current vehicle position;
   a meter display unit for displaying information including at least one of a vehicle speed and a travel distance;
   a transparent panel for covering both the meter display unit and the navigation display unit;
   a frame body for integrating the navigation display unit and the meter display unit together, wherein the frame body frames the navigation display unit independently from the meter display unit so as to distinguish the appearance of the navigation display unit from the meter display unit;
   a control unit for driving the navigation display unit;
   an operating element electronically connected to the control unit, said operating element comprising a main control box which is operatively attached to a handlebar of the vehicle so as to be easily reachable by an operator while driving, said main control box comprising a plurality of control switches for use in controlling selected functions of the navigation display unit during vehicle operation; and
   an acoustic system, the acoustic system comprising at least two mid-range speakers and at least two high-range speakers, wherein the mid-range speakers and high-range speakers are positioned laterally spaced apart from the navigation display unit;
   wherein the navigation display unit is disposed behind the meter display unit relative to the front of the motorcycle, so that the navigation display unit protrudes rearwardly such that the navigation unit is jutted outwardly from the meter unit;
   wherein the meter display unit and the navigation display unit are rigidly integrated together within a housing and covered by said transparent panel, wherein the panel encloses a periphery of the housing so as to resist entry of moisture between the panel and the housing.

* * * * *